US012762929B2

(12) United States Patent
Keilwert et al.

(10) Patent No.: US 12,762,929 B2
(45) Date of Patent: Oct. 13, 2026

(54) GATED NON-FUNGIBLE TOKENS IN A GAMING ENVIRONMENT

(71) Applicant: IGT, Las Vegas, NV (US)

(72) Inventors: Stefan Keilwert, St. Josef (AT); Michael Russ, Graz (AT)

(73) Assignee: IGT, Las Vegas, NV (US)

(*) Notice: Subject to any disclaimer, the term of this patent is extended or adjusted under 35 U.S.C. 154(b) by 25 days.

(21) Appl. No.: 18/517,689

(22) Filed: Nov. 22, 2023

(65) Prior Publication Data

US 2025/0166464 A1 May 22, 2025

(51) Int. Cl.
*G07F 17/32* (2006.01)

(52) U.S. Cl.
CPC ...... *G07F 17/3267* (2013.01); *G07F 17/3241* (2013.01); *G07F 17/3251* (2013.01); *G07F 17/3258* (2013.01)

(58) Field of Classification Search
CPC ............. G07F 17/3267; G07F 17/3241; G07F 17/3251; G07F 17/3258; G07F 17/3244; G07F 17/3255
USPC ............................................................ 726/25
See application file for complete search history.

(56) References Cited

U.S. PATENT DOCUMENTS 10,946,283 B1 * 3/2021 Meilich .............. G06Q 20/3674
2009/0036202 A1 * 2/2009 Baerlocher ......... G07F 17/3244 463/25
2021/0248594 A1 * 8/2021 Yantis ................ G06Q 20/3676
2021/0256808 A1 * 8/2021 Palmisano ......... G06Q 30/0209
2022/0040562 A1 * 2/2022 Walker ....................... A63F 1/06
2022/0156872 A1 * 5/2022 Little ................. G06Q 30/0226
2022/0366762 A1 * 11/2022 Nelson ................ G07F 17/3244
2023/0013623 A1 * 1/2023 Cleveland ............. G07F 17/322
2023/0055064 A1 2/2023 Dalmia et al.
2023/0094247 A1 * 3/2023 Nuhoglu ................ G06Q 20/02 463/40
2023/0117135 A1 * 4/2023 Quigley ............... G06Q 20/389 705/65
2023/0119838 A1 * 4/2023 Meyers ............... G07F 17/3239 463/42
2023/0122552 A1 * 4/2023 Meyers ................. A63F 13/792 463/29
2023/0130594 A1 * 4/2023 Quigley ................. G06Q 20/40 705/65

(Continued)

FOREIGN PATENT DOCUMENTS

WO WO-2005029279 A2 * 3/2005 ........... G06Q 20/425
WO WO 2023/048895 3/2023

OTHER PUBLICATIONS

"Anatomy of a smart contract," Immutable Documentation, 2023, 8 pages [retrieved online Sep. 13, 2023 from: docs.immutable.com/docs/x/anatomy-smart-contract/].

(Continued)

*Primary Examiner* — Philip J Chea
*Assistant Examiner* — Dorianne Alvarado David
(74) *Attorney, Agent, or Firm* — Sheridan Ross P.C.

(57) ABSTRACT

A networked computer system for enabling players of a gaming device to acquire, transfer, and redeem a series of Non-Fungible Tokens (NFTs). Computational power of the networked computer system is also leveraged to support the recordation of NFT transactions, including the acquisition of NFT transactions and the transfer of NFTs.

19 Claims, 10 Drawing Sheets

(56) References Cited

U.S. PATENT DOCUMENTS

| | | | | |
|---|---|---|---|---|
| 2023/0177921 A1* | 6/2023 | Mikulich | G06Q 30/0601 | 463/25 |
| 2023/0222490 A1* | 7/2023 | Meyers | H04L 9/50 | 705/66 |
| 2023/0241507 A1* | 8/2023 | Meyers | A63F 13/792 | 463/42 |
| 2023/0249079 A1* | 8/2023 | Meyers | H04L 9/3228 | 463/42 |
| 2023/0298435 A1* | 9/2023 | Dalmia | G07F 17/3241 | 463/42 |
| 2024/0046250 A1* | 2/2024 | Meyers | G06Q 20/389 | |
| 2024/0062620 A1* | 2/2024 | Hufnagl-Abraham | G07F 17/3239 | |
| 2024/0062621 A1* | 2/2024 | Hufnagl-Abraham | G07F 17/3225 | |
| 2024/0062628 A1* | 2/2024 | Hufnagl-Abraham | G07F 17/3241 | |
| 2024/0066402 A1* | 2/2024 | Milne | A63F 13/69 | |
| 2024/0075392 A1* | 3/2024 | Jaffe | A63F 13/792 | |
| 2025/0090964 A1* | 3/2025 | Grimm | A63F 13/35 | |
| 2025/0104511 A1* | 3/2025 | Alvarez | G07F 17/3241 | |
| 2025/0118157 A1* | 4/2025 | Keilwert | G07F 17/3244 | |
| 2025/0118158 A1* | 4/2025 | Keilwert | G06Q 20/3825 | |
| 2026/0057373 A1* | 2/2026 | Quigley | G06Q 20/3672 | |

OTHER PUBLICATIONS

"Blockchain," Wikipedia, last updated Sep. 10, 2023, 32 pages [retrieved onilne from: en.wikipedia.org/w/index.php?title=Blockchain &oldid=1174761458].

"ERC-721 Non-Fungible Token Standard," Ethereum, last edit Jun. 23, 2023, 6 pages.

"ERC-1155 Multi-Token Standard," Etherum, last edi Apr. 7, 2023, 7 pages.

"How to set up a token-gated event," Oveit, Inc., Jan. 11, 2023, 16 pages.

"Non-fungible tokens (NFT)," Ethereum, last updated Sep. 13, 2023, 9 pages [retrieved online from: ethereum.org/en/nft/].

"Non-fungible token," Wikipedia, last updated Aug. 26, 2023, 25 pages [retrieved online from: en.wikipedia.org/w/index.php?title=Non-fungible_token&oldid=1172369277].

"Science & Tech Spotlight: Non-Fungible Tokens (NFTs)," U.S. Government Accountability Office, Jun. 14, 2022, GAO-22-105990, 5 pages.

"STN Charms." Station Casinos LLC., 2023, 4 pages [retrieved online Jul. 13, 2023 from: stncharms.com].

"Token-gated Application Architecture," Unclock, Inc., 2023, 4 pages.

"Token Gating: What it is and How it Works," Super Ultra, Apr. 17, 2023, 3 pages.

"What Is Proof of Ownership in Blockchain," Alibaba Cloud, 2023, 6 pages.

"What is Token Gating in the NFT world?" PrimaFelicitas, Dec. 9, 2022, 8 pages.

"Why Token-Bound Content, Not Token-Gated, is the Future," Darkblock, 2023, 7 pages.

Agarwal "Everything on Token Gating," Apr. 5, 2023, 19 pages.

Agbo "What is Token Gating?" CoinGecko, updated May 9, 2023, 12 pages.

Alchemy "What is NFT token gating?" Alchemy Insights, Inc., last updated Oct. 19, 2022, 10 pages.

Conti "What Is an NFT? Non-Fingible Tokens Explained," Forbes, updated May 17, 2023, 17 pages.

Cuban "non-fungible token," Britannica, last updated Aug. 22, 2023, 22 pages [retrieved online from: https://www.britannica.com/topic/non-fungible-token].

Cvetkovic "Token Gating and NFTs for Retailers: Guide," Jun. 17, 2022, 18 pages.

Finzer "The Non-Fungible Token Bible: Everything you need to know about NFTs," Jan. 10, 2020, 21 pages [retrieved online from: blog-v3.opensea.io/articles/non-fungible-tokens].

Graham "Token Gating Explained," Jul. 5, 2023, 8 pages.

Hayes "Blockchain Facts: What Is it, How It Works, and How It Can Be Used," Apr. 23, 2023, 17 pages.

Kramer et al. "Beginner's Guide to NFTs: What Are Non-Fungible Tokens?" Decrypt, Jan. 12, 2022, 21 pages [retrieved online from: decrypt.co/resources/non-fungible-tokens-nfts-explained-guide-learn-blockchain].

Norris "What is 'Token Gating' and How Does it Work?" Dec. 22, 2022, 9 pages.

Ravikiran "Discover NFTs: Your Ultimate Guide to Non-Fungible Tokens," Simplilearn Solutions, last updated Aug. 29, 2023, 22 pages [retrieved online from: www.simplilearn.com/tutorials/blockchain-tutorial/what-is-nft].

Rossolillo "What is an NFT?" The Motley Fool, updated Jun. 28, 2023, 12 pages.

Salhuana "The Ultimate Guide to Token Gating: What It Is and Why It Matters," Nov. 3, 2022, 8 pages.

Willox "An NFT minting smart contract, explained. Line by line,." Linkedin, Feb. 1, 2022, 21 pages [retrieved online from: www.linkedin.com/pulse/nft-minting-smart-contract-explained-line-matthew-willox].

Xie "A beginner's guide to NFTs," Jan. 4, 2021, 16 pages [retrieved online from: linda.mirror.xyz/df649d61efb92c910464a4e74ae213c4cab150b9cbcc4b7fb6090fc77881a95d].

* cited by examiner

GATED NON-FUNGIBLE TOKENS IN A GAMING ENVIRONMENT

BACKGROUND

The present disclosure is related to networked computer systems and, more particularly, to gaming devices and gaming systems.

Current gaming devices and Electronic Gaming Machines (EGMs) are managed in the context of a large computational network. Operating such a large computational network comes with disadvantages, including network downtime, operational costs, and network maintenance. From the perspective of a casino operator, simply offering more money to players of gaming devices and EGMs only increases these complexities.

BRIEF SUMMARY

Finding a way to leverage a large computational network to support additional gameplay functionality and features would provide the casino operator with benefits not previously realized. In certain embodiments, the present disclosure relates to a gaming system that manages the acquisition, redemption, and transfer of Non-Fungible Tokens (NFTs), particularly gated NFTs.

In some embodiments, a gaming system or method is provided that includes: a processor; and computer memory coupled with the processor, the computer memory comprising data stored thereon that, when executed by the processor, causes the processor to: receive, from a gaming device of a player of a game of chance, a request to redeem a gated Non-Fungible Token (NFT), the gated NFT providing an exclusive token gated benefit from the gaming system available only to an owner of the gated NFT; authenticate that the player owns a digital wallet identified by the player; when the player is an authenticated owner of the digital wallet, determine from the digital wallet that the digital wallet contains the gated NFT; and when the digital wallet contains the gated NFT, provide the exclusive token gated benefit to the player.

In some embodiments, a gaming system or method is provided that includes: receiving, from a gaming device of a player of a game of chance, a request to redeem a Non-Fungible Token (NFT), the NFT providing a token benefit from a gaming system available only to an owner of the NFT; determining, by a processor, that a predetermined gaming event, upon which redemption of the NFT is contingent, has occurred, in response to occurrence of the predetermined gaming event, verifying, by the processor, that the player owns a digital wallet identified by the player; when the player is a verified owner of the digital wallet, determining, by the processor, from the digital wallet that the digital wallet contains the NFT; and when the digital wallet contains the NFT, providing, by the processor, the token benefit to the player.

In some embodiments, a gaming system or method is provided that includes: a processor and computer memory coupled with the processor, the computer memory comprising data stored thereon that, when executed by the processor, causes the processor to: determine that a predetermined event has occurred in the gaming system; and in response, change a value of a use counter associated with a Non-Fungible Token (NFT) associated with a player, wherein the use counter determines a number of possible token redemptions for the NFT.

In some embodiments, a system or method is provided that includes: a processor and computer memory coupled with the processor, the computer memory comprising data stored thereon that, when executed by the processor, causes the processor to: render a display of a digital wallet, wherein the digital wallet presents a Non-Fungible Token (NFT) currently owned by the player, wherein a presentation parameter in metadata associated with an icon or digital image representing the NFT changes based on a current value of the NFT's use counter and wherein the use counter determines a number of possible token redemptions for the NFT.

In some embodiments, a gaming system or method is provided that includes: a processor and computer memory coupled with the processor, the computer memory comprising data stored thereon that, when executed by the processor, causes the processor to: restrict or prevent access (e.g., by a browser or digital wallet application) of a third party player (whether as part of a trade or purchase of a gated NFT) to content (e.g., a transaction (such as transaction involving or associated with a gated NFT smart contract, token state change, or use counter value change), or metadata, or smart contract associated with an gated NFT owned by a player) unless or until the third party player is associated with or completed a game or non-game activity or event, joined a player group, earned player loyalty reward or at least a predetermined number of promotional credits, or category, or other predetermined requirement.

Additional features and advantages are described herein and will be apparent from the following Description and the figures.

DETAILED DESCRIPTION

Figure 1:
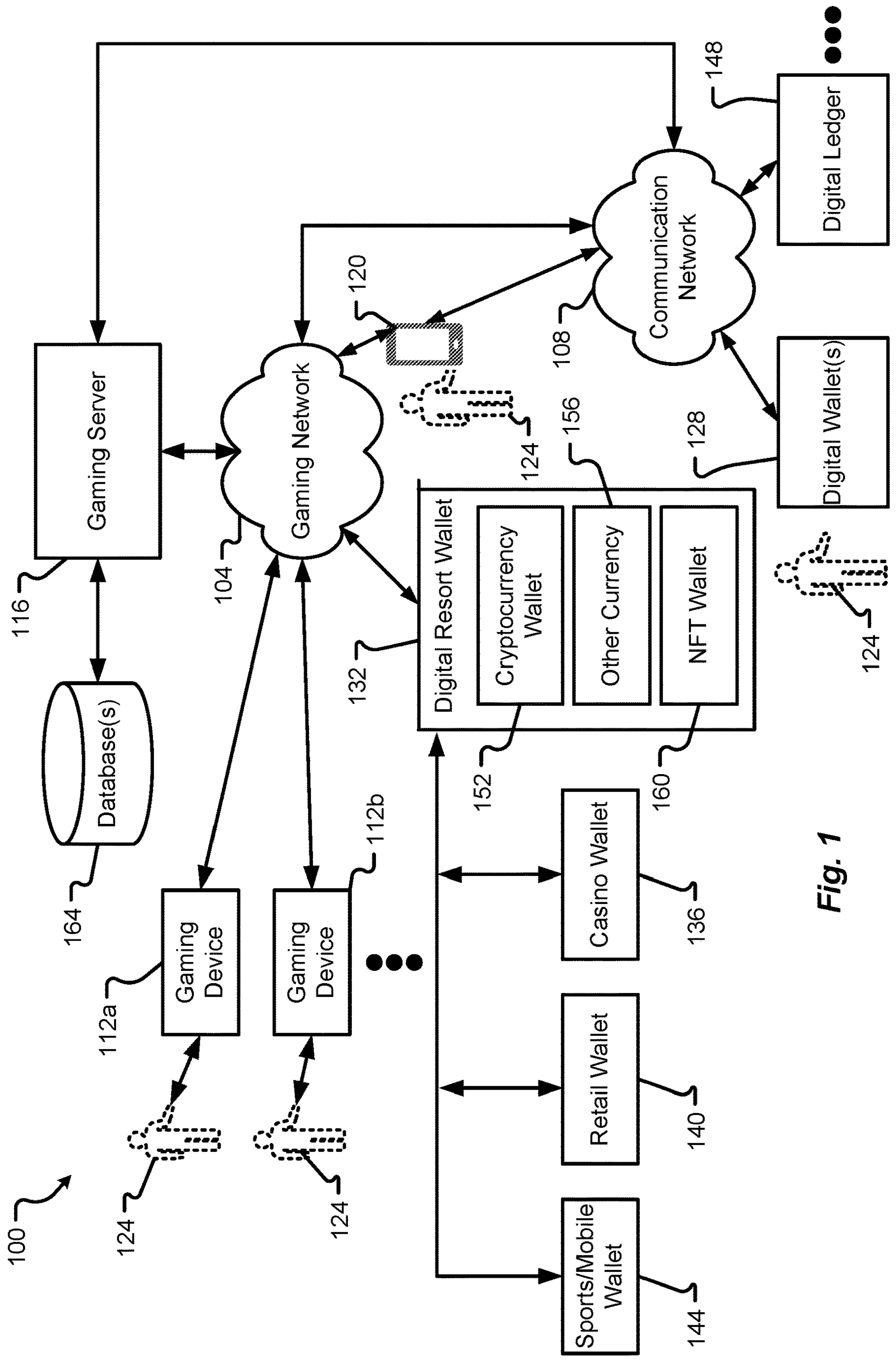
FIG. 1 is a block diagram of a gaming system in accordance with embodiments of the present disclosure.

From a casino perspective, creating cost effective player rewards (compared to monetary player loyalty rewards, vouchers, etc.), which lead to cost saving opportunities for the operator, are highly desirable. It is also desirable to offer rewards that leverage the larger computational network that is owned and operated by the casino operator. It is further desirable to reduce losses to fraudulent behavior arising from actors posing as an owner of an account, such as a cash or loyalty account, of another player.

If game-specific NFTs are offered, players would focus on playing the one game they like most. The number of available NFTs within each game could be limited. Thus, once a player collected all (or at least the most important) NFTs of one game, they might no longer be interested in playing that game, as they have encountered each situation the game can provide.

Existing solutions that try to draw a player from one game to another (such as achievement-like mechanisms) require the player to participate in specialized achievement-like bonus programs/apps/databases/ . . . to track player progresses. Finally, existing cross-game attracting solutions are rather difficult to implement; they need a funding pot, which can be difficult to implement on a number of technical and business levels.

Embodiments of the present disclosure, however, award players ownership of transferable or non-transferable gated NFTs, which provide an exclusive token gated benefit from the gaming system available only to a verified or authenticated owner of the gated NFT. Gated NFTs grant restricted or gated access to exclusive token benefits, such as content, an additional gameplay feature, a gameplay setting, a gameplay award, membership in a player group, a player loyalty reward, participation in or completing a game or non-game activity or event, a promotional credit award, and a casino voucher, to the owner of the gated NFT. The exclusive token gated benefit is typically defined by a smart contract associated with the gated NFT. The benefits may not be offered to other non-owner players. Token gating can provide a mechanism that restricts access to an NFT or NFT collection and can control who can view, earn, recharge, redeem, or transfer the NFTs. For example, the smart contract associated with the NFT can gate or limit or restrict access to the NFT smart contract or associated metadata to those third party non-owners meeting one or more predetermined requirements, such as being associated with or completing a game or non-game activity or event, membership in a player group, player loyalty reward or category, and the like.

Exemplary gated NFT token benefits include activating a gated NFT in a game (e.g., slot game), to enable a bonus play-off which is not available to and/or hidden from other players or to offer a part of the game or game feature that is available only to gated NFT owners; providing to the owner of the gated NFT the opportunity to join a product launch in a casino or accept membership in a player group, providing to the owner of the gated NFT exclusivity to attend a gaming or loyalty event or join such event at a reduced entry fee, providing the gated NFT owner the option to activate the token to activate an option to store or restore one or more game settings or player preferences or convenience features that are not available to other players; providing the gated NFT owner with one or more exclusive benefits for returning frequently (e.g., returning to a casino a determined number of times over a selected time interval), such as, by a benefit of rewarding promotional credits to the gated NFT owner; and offering to the gated NFT owner the feature to receive e.g., casino vouchers (coffee, meal, etc.) if certain preconditions are met (e.g., $X (e.g., $200) in wagers played off, Y (e.g., $3^{rd}$) visit to the casino in a week, etc.).

NFTs, and gated NFTs in particular, can be applied in the gaming business to reward players for achievements or loyalty to offer exclusivity, and other purposes. For example, a player might be engaged to acquire a gated NFT instead of just playing the game for a single session. Introducing a gated NFT also gives the manufacturer/operator the chance to draw players to particular games selected by the manufacturer/operator. The use of gated NFTs that offer exclusive and personalized benefits to a player owner can not only increase player satisfaction but also increase player trust in the gaming system and/or gaming device.

"NFT" refers to gated and/or non-gated NFTs, throughout this disclosure unless otherwise indicated.

NFTs can have a token state that is triggered by a predetermined event. For example, the NFT can have a first or inactive token state until occurrence of a predetermined event at which point the NFT token state changes to a second or active token state. Examples of predetermined events include receipt of a payment from a player, transfer of ownership of the gated NFT to a different player, occurrence of a gameplay event, play of the game of chance by the player a predetermined number of times within a predetermined time interval, play of the game of chance by the player using at least a minimum denomination, expiration of a specified time interval, the player being located in a selected physical location, a minimum or determined loyalty level of the player, a minimum or determined promotional credit balance of the player, and the gaming system being in a predetermined state. The NFT can retain the second state until occurrence of a second predetermined event, such as any of the events noted above. For example, the NFT can remain in the second token state until expiration of a determined time interval following transition from the first to the second token state. Upon expiration of the determined time interval, the NFT token state transitions from the second token state back to the first token state.

NFTs can be cryptographically verifiable, unique or scarce, and easily transferable. NFTs can implement the ERC-721 standard (which requires the pair of token identifier and smart contract blockchain address to be globally unique), the ERC-1155 multi-token standard (which manages multiple token types), or any other suitable standard for NFT deployment.

Unlike cryptocurrencies, gated NFTs cannot be exchanged for one another, as each gated NFT is unique. Cryptocurrency, on the other hand, is fungible and can be traded with equivalency. Unlike gated NFTs that can have differing redemption values, cryptocurrencies, such as Bitcoin, have common values, so they can be traded freely for one another.

The NFT tokens can be generated or minted for monetary or non-monetary input or free of charge. As will be appreciated, the NFT minting process commonly entails a new block in the blockchain or digital ledger being created, NFT information being validated by a validator, and the block being closed. As NFT tokens are minted, they are assigned a unique identifier directly linked to a blockchain address associated with the block storing a smart contract. Each token has an owner, and the ownership information (i.e., the address in which the minted token resides) is publicly available. This minting process often entails incorporating a smart contract that assigns ownership and manages the transferability of the NFT. As will be appreciated, a smart contract is a self-executing program or script that automates one or more actions set forth in the smart contract governing the NFT corresponding to the smart contract. The actions stipulate what NFT operations or uses are permissible and the requirements for the actions to be executed. Exemplary actions include transferring NFT ownership, redemption and associated benefits to be executed upon redemption, recharging use counter value, changing a token state of NFT, and the like. Once completed, the transactions are recorded in a block on the digital ledger also containing the closed block storing the smart contract and are therefore trackable and irreversible. Accessing the benefits included in the NFT can be via scanning a dynamic QR code associated with the NFT, by a program, such as WalletConnect™, or by a browser associated with a digital hard wallet or wallet containing a wallet extension. Generally, the NFTs in the wallet can be accessed using a public key associated with the wallet.

The uniqueness and ownership of NFTs, and the embedded NFT metadata and transaction history, can be easily and securely validated through immutable public records on the open and distributed blockchain or digital ledger, thereby enabling any NFT to be traded or exchanged. NFTs are commonly implemented as cryptographic assets stored on the blockchain with unique identification codes and metadata that distinguish them from each other. As will be appreciated, a blockchain is a distributed database or ledger shared among distributed network nodes that maintains a secure and decentralized record of transactions for digital assets, such as NFTs.

Embodiments of the present disclosure leverage many technical aspects of digital ledgers with a gaming network. In particular, supporting the utilization of NFTs and gated NFTs within a gaming network requires access to digital wallet technology, NFT management technology, and the digital ledger(s) on which NFT-related transactions can be recorded.

The use of digital wallet technology and digital ledger(s) can increase casino security and reduce losses to fraudulent behavior, such as identity theft or forgery, arising from actors posing as an owner of an account, such as a cash or loyalty account, of another player. It can further provide player owners and non-owners with a secure record of all NFT transactions, including not only ownership transfers but also redemptions, use counter value or token state changes, and other events involving the NFT, recorded in the blockchain associated with the NFT. Blockchain and other digital ledgers are a decentralized distributed ledger system that makes every NFT asset transaction immutable and transparent, eliminating the need for a third-party intermediary. Thus, each transaction of an NFT on the blockchain provides proof of ownership and current NFT state as well as current values of many other NFT parameters and variables. Verification to confirm ownership or state of a digital wallet associated with an owner of an NFT provides an added layer of security for the gaming operator and a player owner or non-owner.

Authentication commonly occurs using standard public key cryptographic technology. In one embodiment, both the gaming system or casino and player have unique accounts (e. g. digital wallets) on the blockchain with associated private keys that are used to digitally sign requests sent to the smart contract. When interacting with the blockchain through a web application such as an NFT marketplace (such as blockchain or digital ledger platform), users may be required to have an acceptable third-party wallet application installed that provides an application programming interface ("API") for the web application to communicate with the blockchain on behalf of the player. In other embodiments, the gaming system may use a custodial wallet owned by the casino entity that may be used to facilitate transactions associated with NFTs on the blockchain system. Typically, authentication of ownership of the digital wallet requires decrypting a hash of a selected message (commonly generated using the player's private key) using a public key associated with an electronic address of the digital wallet. The public key is determined using the digital wallet's electronic address.

Embodiments of the present disclosure can condition redemption of an NFT to receive a token benefit upon occurrence of a predetermined gaming event. Examples of such predetermined gaming events include one or more of receipt of a payment, transfer of ownership of the gated NFT to a different player, occurrence of a gameplay event involving the player owner, the player owners playing the game of chance a predetermined number of times within a predetermined time interval, the player owner playing the game of chance using at least a minimum denomination, expiration of a specified time interval, the player owner being located in a selected physical location, the player owner having a minimum or specified loyalty level, the player owner having a minimum or specified promotional credit balance, the player owner using the NFT for a specific game or gameplay event, and the gaming system being in a predetermined state regardless of any activity or event involving the player owner.

Embodiments of the present disclosure can associate use of NFT with a use counter that determines a number of possible token redemptions for the NFT. As used herein, a "use" or "charge" of an NFT can be any action defined by the smart contract or metadata of the NFT, such as an NFT redemption to receive one or more benefits associated with the NFT, a transfer of NFT ownership, and the like. The use counter value is incremented or decremented in response to occurrence of a predetermined event in the gaming system. The predetermined event can include one of redemption by the player owner, receipt of a payment from a player, transfer of ownership of the NFT to a different player, occurrence of a gameplay event involving the player owner, the player owner playing a game of chance a predetermined number of times within a predetermined time interval, the player owner playing the game of chance using at least a minimum denomination, expiration of a specified time interval, the player owner being located in a selected physical location, the player owner having at least a predetermined loyalty level of the player, the player owner having at least a predetermined a promotional credit balance of the player, and the gaming system being in a predetermined state regardless of any activity or event involving the player owner.

The NFT can have a state that depends on the value of the use counter or occurrence of the predetermined event. For example, in a first token state resulting from the use counter having a value in a first set of use counter values, the NFT is non-redeemable and, in a second token state resulting from the use counter having a value in a second set of use counter values, the NFT is eligible to be redeemed for a token benefit. Incrementing or decrementing the use counter value can cause the token state to change from the first to the second token state or vice versa.

For example, an NFT, whether gated or ungated, might have X activations per owner (paid, free, or requiring certain contingent thresholds to be met). Upon these X activations, the token becomes useless for the owner or is assigned to the first token state. Thus, the owner might decide to keep the NFT (e.g., as a souvenir), or to sell, trade, gift, or otherwise transfer it to another player (e.g., via a casino-related crypto market). Upon transferring ownership, the previous owner could receive cash or digital currency (e.g., cryptocurrency), and, in exchange, the new owner of the NFT would receive the refreshed token (e.g., with a fully or partially refreshed number of charges or new use counter value such that the NFT has returned to the second token state). Through the transaction, however, the casino would receive a commission, such as X % of the token's transaction value (which commission would be defined in the smart contract associated with the token) typically in addition to any crypto gas fees.

In another example, instead of selling a token to another owner, different owners of empty tokens (or tokens in the first token state) might initiate a trade. Each owner would receive the other owner's token, with a recharged use counter value such that each token has returned to the second token state, subject to payment of a certain transaction fee for the trade (which as noted is defined in the smart contract and given to the casino) typically in addition to any crypto gas fees. This is different from simply reminting a new token for each owner and can provide a more secure token transfer and recharge mechanism. Leveraging cryptographic signatures native to the blockchain on which an NFT is issued can enable a nonowner to easily determine the origin and the current owner of the asset in question in seconds. Reminting a new token can be subject to a greater risk of fraud due to fraudulent consensus voting nodes authenticating the transaction, such as by a proof of work or stake mechanism or combination thereof.

In another example, such as a predetermined number of times during a casino visit, e.g., once per week, per month, etc., tokens are rendered fully usable by being moved from the first to the second token state (e.g., the use counter is recharged to a maximum number of charges or redemptions or uses). Upon each use, e.g., number of charges incremented or decremented (depending on whether the use counter is decremented or incremented, respectively, after each use) by 1. Once exhausted (no charges remain on the use counter—or the NFT is in the first token state), the token is temporarily not usable. After a last use, the token can initiate a "self-refreshment process"; displaying on an icon or image associated with the NFT a "refresh" countdown or count up directly after a last use of the token (e.g., displaying a message such as: "Token will be available for use in 05:03:54 hours"). The self-refreshment process causes the use counter to be fully or partially recharged and changed from the first to the second token state.

In some embodiments, a player owner is required to fulfill certain (in-game) actions (such as obtain a certain game outcome or receive a bonus, play a type of game, etc.), meet certain game event thresholds (e.g., place a minimum wager amount or play the game with at least a threshold intensity), or perform gameplay or loyalty activities to refresh partially or fully the use counter value and therefore token usage.

In some embodiments, the token charge for recharging partially or fully the use counter is made via the gaming device or a smart phone to the gaming system; that is, the NFT player owner pays $X to activate or recharge token functionality (such as by changing a value of the use counter or the token state from the first to the second token state). The token charge can be, for instance, made via crypto gas fees, as the token is stored in a player's crypto digital wallet. Activating the token can deduct crypto gas fees directly from the digital wallet and transfer the gas fees directly to the operator's crypto wallet. Then, the gaming device need only verify if the transaction from the crypto wallet has been completed.

Any change in a block of the use counter value or token state, such as by redemption or NFT ownership transfer, would be recorded in the blockchain stipulated in the smart contract for the NFT. Accordingly, any non-owner, such as the gaming system, can read out the block in the blockchain that contains the transaction log recharging the use counter or changing the token state. In this manner, any non-owner can verify, in a secure manner, the current token state and use counter value.

In some embodiments, a player may be allowed to play a game of chance, such as a slot game. During interactions with the game of chance, the player may be eligible to win cash or credit. Any eligible cash win or other type of game event can trigger an additional NFT reward. By scanning the NFT reward with the player's mobile device, the NFT can be added to the player's digital wallet. Addition of the NFT to the player's digital wallet may occur automatically (e.g., without receiving player input after the NFT has been earned) or with permission of the player (e.g., by receiving player input after the NFT has been earned). In some embodiments, automated redemption of the NFT may be facilitated by the player indicating a desire for automated NFT redemption when game events allow, thereby enabling the player to continue interacting with the game of chance without further interruption. In other words, the player may have a predefined preference (e.g., within the game of chance or within a player profile) that indicates to the game of chance how to handle NFTs when earned (e.g., whether to enable automated or non-automated redemption of new NFTs). The player's digital wallet may be configured to display all NFTs owned by the player. The digital wallet can leverage digital ledger technology (e.g., a blockchain) or a simple database.

Embodiments of the present disclosure will be described in connection with a gaming device having a capability to enable NFT collection and to adjust gameplay features based on NFTs that have been earned and redeemed by the player (e.g., that are stored in the player's digital wallet). While certain embodiments of the present disclosure will reference the use of gaming devices, such as an Electronic Gaming Machine (EGM), Electronic Gaming Table (EGT), lottery vending machine, virtual gaming machine, or video gaming gambling machine (VGM), as a device that facilitates such capabilities, it should be appreciated that embodiments of the present disclosure can be used with any computer-controlled gaming device or collection of gaming devices or other devices controlled by a gaming server.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system 100 according to embodiments of the present disclosure may include one, some, or all of the components depicted in the system 100 and does not necessarily have to include all of the components. For instance, the components may be distributed amongst a plurality of servers and/or gaming devices (e.g., an EGM, etc.) without departing from the scope of the present disclosure. The illustration of a single central gaming server 116 is for ease of discussion and should not be construed as limiting embodiments of the present disclosure to a single-server architecture.

The gaming system 100 is shown to include a gaming network 104 and a communication network 108. The gaming network 104 may correspond to a distributed set of devices that interconnect and facilitate machine-to-machine communications between one or multiple gaming devices 112*a*, 112*b*, . . . , a mobile device 120, one or more player digital wallets 128, a digital ledger 148, and one or more databases 164. The digital resort wallet 132 may encapsulate or include one or more of a casino wallet 136, a retail wallet 140, and/or a sports/mobile wallet 144.

The communication network 108 may correspond to a distributed set of devices that interconnect and facilitate machine-to-machine communications between the components of the gaming system 100 and external components including the mobile device 120, digital wallet(s) 128 and digital ledger 148. In some embodiments, the gaming network 104 and communication network 108 may correspond to different networks administered and/or maintained by different entities. In such a scenario, one or more of a gateway, firewall, or similar network border device may reside between the gaming network 104 and the communication network 108 (e.g., to maintain security preferences/settings of each network). In another possible scenario, the gaming network 104 and communication network 108 may correspond to the same or similar network. As a non-limiting example of the second scenario, the gaming network 104 and communication network 108 may both correspond to a distributed Internet Protocol (IP)-based communication network, such as the Internet.

The gaming network 104 and communication network 108 may include any type of known communication medium or collection of communication media and may use any type of protocols to transport messages between devices. As some non-limiting examples, the gaming network 104 may correspond to a WAN or LAN in which the plurality of gaming devices 112*a*, 112*b*, . . . are configured to communicate with the gaming server 116 using devices that are owned and administered by the same entity that administers security settings of the gaming devices 112*a*, 112*b*, . . . . As such, the gaming network 104 may be considered a secure or trusted network.

The communication network 108, in some embodiments, may also include a WAN or LAN. Alternatively or additionally, the communication network 108 may include one or more devices that are not administered by the same entity administering the gaming devices 112*a*, 112*b*, . . . . Thus, the communication network 108 may be considered an untrusted or unsecure network from the perspective of the gaming network 104. The Internet is an example of the communication network 108 that constitutes an IP network consisting of many computers, computing networks, and other communication devices located all over the world, which are connected through many telephone systems and other means. Other examples of the communication network 108 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 108 may be administered by a Mobile Network Operator (MNO) whereas a casino entity may administer the gaming network 104.

It should be appreciated that the gaming network 104 and/or communication network 108 need not be limited to any one network type, and instead may be comprised of a number of different networks and/or network types. Moreover, the gaming network 104 and/or communication network 108 may comprise a number of different communication media such as coaxial cable, copper cable/wire, fiber-optic cable, antennas for transmitting/receiving wireless messages, wireless access points, routers, and combinations thereof.

In some embodiments, the gaming devices 112*a*, 112*b*, . . . may be distributed throughout a single property or premises (e.g., a single casino floor) or the gaming devices 112*a*, 112*b*, . . . may be distributed among a plurality of different properties. In a situation where the gaming devices 112 *a*, 112*b*, . . . are distributed in a single property or premises, the gaming network 104 may include at least some wired connections between network nodes (e.g., a LAN or multiple LANs). As a non-limiting example, the nodes of the gaming network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 112 *a*, 112*b*, . . . may utilize the same or different types of communication protocols to connect with the gaming network 104. It should also be appreciated that the gaming devices 112 *a*, 112*b*, . . . may or may not present the same type of game to a player 124. It should be appreciated that a gaming device 112 *a*, 112*b*, . . . may correspond to one example of a gaming device. It should also be appreciated that the functions and features described in connection with a gaming device 112 *a*, 112*b*, . . . may be provided in any other type of gaming device without departing from the scope of the present disclosure. Mobile devices 120 may also be considered to have functionality of a gaming device 112*a*, 112*b*, . . . , and vice versa.

In some embodiments, the gaming devices 112 *a*, 112*b*, . . . may be configured to communicate with a centralized management server in the form of the gaming server 116. The gaming server 116 may be configured to manage games of chance, games of skill, or hybrid games of chance/skill played at the gaming devices 112 *a*, 112*b*, . . . and/or mobile devices 120 (e.g., slot games, video poker games, lottery games, keno games, etc.), enable execution of a different game (e.g., a card game), monitor player 124 activity at the gaming devices 112*a*, 112*b*, . . . , track player 124 association with a gaming device 112, track player 124 utilization of mobile devices 120, track player 124 gaming sessions at the gaming devices 112*a*, 112*b*, . . . , and/or mobile devices 120, facilitate communications with players 124 via the gaming devices 112 *a*, 112*b*, . . . , and/or perform any other task in connection with games played by a player 124 at gaming devices 112*a*, 112*b*, . . . and/or mobile devices 120.

It should be appreciated that the gaming server 116 may or may not be co-located with the gaming devices 112. Thus, one or more gaming devices 112*a*, 112*b*, . . . may communicate with the gaming server 116 over a WAN, such as the Internet. In such an event, a tunneling protocol or Virtual Private Network may be established over some of the communication network 108 to ensure that communications between a gaming device 112*a*, 112*b*, . . . and a remotely-located gaming server 116 are secured.

System 100 also contemplates the possibility of some personal gaming mobile devices 120 (e.g., smart phones, tablet computers, etc.) being paired with a gaming device 112*a*, 112*b*, . . . , thereby enabling communications to flow between the personal gaming mobile device 120 on the one hand and the gaming device(s) 112*a*, 112*b*, . . . on the other. This communication may utilize a proximity-based communication protocol, such as Bluetooth, BLE, NFC, WiFi, etc. One or more personal gaming devices (e.g., a mobile device 120) of the player 124 may not necessarily be paired with a gaming device 112*a*, 112*b*, . . . , but such personal gaming devices may still be configured to communicate with the gaming server 116 via the communication network 108. Communications between the gaming device 112*a*,

112*b*, . . . and personal gaming mobile device may facilitate any number of combinations of gameplay opportunities.

The gaming server 116 is in communication, via the gaming network 104, with one or more databases 164. The database(s) 164 may be configured to store one or multiple data structures (which can include the digital resort wallet 132, casino wallet 136, retail wallet 140, and sports/mobile wallet 144) that are used in connection with interactive gaming activities of players 124 and the gaming system 100. Alternatively or additionally, the database(s) 164 may be configured to store profile information for the player 124, thereby enabling enhanced gameplay opportunities for the player 124 within the system 100. The database(s) 164 can use any database model and compatible database management system. Examples of database models include relational databases, object-oriented databases, and non-relational databases, such as NoSQL and NewSQL databases.

In various embodiments, a gaming establishment fund management function in the gaming server 116 that includes one or more cashless wagering systems that are each associated with or otherwise maintain one or more cashless wagering accounts. In certain embodiments, the gaming establishment fund management function includes a first cashless wagering system that maintains a first cashless wagering account, in which a player utilizes a mobile device 120 application or app running on a mobile device 120 to facilitate the electronic transfer of any funds between the first cashless wagering account and a gaming device 112. For example, as seen in FIG. 1, a digital resort wallet 132 or enterprise wallet includes or is otherwise in communication with a sports/mobile wallet 144 (i.e., a first cashless wagering account maintained by a first cashless wagering function) accessible via the mobile device 120 running a mobile device application as described herein.

In certain embodiments, the gaming establishment fund management system additionally or alternatively includes a second cashless wagering function that maintains a second cashless wagering account associated with a physical instrument, such as a player issued magnetic striped card. In these embodiments, a player utilizes the physical instrument (e.g., via inserting the card into a player tracking unit associated with a gaming device) to facilitate the electronic transfer of any funds between this second cashless wagering account and the gaming device. Continuing with the example, as seen in FIG. 1, the resort or enterprise wallet 132 also includes or is otherwise in communication with a casino wallet 136 (i.e., a second cashless wagering account maintained by a second cashless wagering function) accessible via a physical instrument, such as a player issued magnetic striped card associated with the second cashless wagering function or a mobile device 120 associated with the second cashless wagering function.

In various embodiments, in addition to or an alternative of maintaining one or more cashless wagering accounts via one or more cashless wagering functions, the gaming establishment fund management function includes one or more gaming establishment retail functions that each maintain one or more gaming establishment retail accounts. Such a gaming establishment retail account (i.e., a gaming establishment retail wallet 140) integrates with various retail point-of-sale systems throughout the gaming establishment to enable players to purchase goods and/or services via the player's gaming establishment retail account. Continuing with this example, as seen in FIG. 1, the resort or enterprise wallet 132 further includes or is otherwise in communication with the retail wallet 140 (i.e., a gaming establishment retail account maintained by a gaming establishment retail function) accessible via a point-of-sale terminal associated with a gaming establishment.

In various embodiments, the digital resort wallet 132 and/or player's digital wallet 128 may include or comprise one or more cryptocurrency wallet(s) 152, other currency 156, and an NFT wallet 160. As will be described in further detail herein, the NFT wallet 160 may be used to store one or more NFTs that have been earned and redeemed by player 124. In some embodiments, each NFT earned and redeemed by the player 124 may correspond to a minted game symbol that corresponds to a particular game that is playable on a gaming device 112*a*, 112*b*, . . . , and/or mobile device 120. One or more NFTs stored in the NFT wallet 160 may be associated with a particular game or series of games. One or more NFTs may also be used to unlock or enable particular gameplay features within a game or series of games. One or more NFTs may be configured as gated NFTs providing an exclusive benefit to the digital account owner. It should be appreciated that the contents of the digital wallet(s) 128, 132 may be maintained separately, meaning that the cryptocurrency wallet 152 may be maintained separately from the other currency 156, which may be maintained separately from the NFT wallet 160. Financial implementations facilitated by the cryptocurrency wallet 152 and other currency 152 could happen independently from the game as NFT minting does not cost much but can create high rewards. While NFTs may be described as being associated with a particular game (e.g., earnable and redeemable while playing a particular game, then useable for unlocking gameplay features within the particular game), it should be appreciated that NFTs can also be used to support cross-game behaviors and achievements. For instance, an NFT that is earnable and redeemable within one game, may unlock gameplay features within another, different, game. Further still, an NFT collection may contain NFTs all associated with a particular game or an NFT collection may contain NFTs associated with two or more different games without departing from the scope of the present disclosure.

In certain embodiments, the digital resort wallet 132 account associated with a player 124 includes one or more gaming establishment cryptocurrency accounts associated with respective cryptocurrency blockchain networks. For example, the digital resort wallet 132 associated with the player 124 can include a gaming establishment bitcoin account associated with the player and a gaming establishment Ethereum account associated with the player.

The gaming server 116, gaming devices 112, mobile device 120, and digital resort wallet(s) 128, 132 are in communication, via communication network 108. The digital ledger 148 is commonly a distributed ledger (also called a shared ledger or distributed ledger technology or DLT) that is a consensus of replicated, shared, and synchronized digital data geographically spread across multiple spatial locations. Unlike a centralized database, there is commonly no central administrator for a digital ledger 148. The digital ledger 148 can employ Replicated Journal Technology, since the information is replicated in the nodes containing a full copy of the information and the information in the blocks is included in timely order, more in the form of an accounting journal than as an accounting ledger. In some embodiments, the digital ledger 148 is a blockchain distributed ledger. The digital ledger 148 may be permissioned or permissionless and employ one or more consensus algorithms, e.g., proof of work, proof of stake, hybrids thereof, and hashgraph. The digital ledger 148 may be minable (one can claim ownership of new coins contributing with a node) and can be a non-blockchain DLT that can be in the form of a distributed cryptocurrency. While blockchain requires global consensus across all nodes, a non-blockchain DLT can achieve consensus without having to validate across the entire blockchain.

Thus, it should be appreciated that in this embodiment, the cryptocurrency wallet 170 or NFT wallet 160 (and/or the gaming establishment fund management function) is in communication with each of the respective digital ledgers 148 for which the gaming establishment cryptocurrency wallet 152 includes a corresponding gaming establishment cryptocurrency and/or NFT account. Moreover, to facilitate the transferring of cryptocurrency and/or NFTs between digital wallets 128, 132 of a player 124 or between different players 124, the digital ledger 148 may be utilized and processing capabilities of devices within the system 100 may be used to validate transactions on the digital ledger 148. It should be appreciated that in various embodiments, a person may not need to "register" an account with his or her external digital ledger 148.

In general, to transfer funds and/or NFTs between different accounts, a transaction request is created and submitted to the respective cryptocurrency digital ledger 148 by the digital wallet (and/or the mobile device application) initiating the transfer. The transaction request includes (amongst other information) (1) a source account identifier (e.g., a public key of a source wallet) (2) a destination account identifier (e.g., a public key of a destination wallet), (3) a transfer type identifier (i.e., a deposit (or transfer-in) or a withdrawal (or transfer-out), and (4) an identifier of the object being transferred (e.g., an amount of cryptocurrency to be transferred.

In the case of NFT redemption, use counter value change, NFT ownership transfer, or other change in information associated with an NFT, a transaction request is created and submitted to the respective digital ledger 148, which minted the NFT, by the digital wallet (and/or the mobile device application) initiating the transaction. The transaction request can include (amongst other information) (1) a source account identifier (e.g., a public key of a source wallet) (2) depending on the type of transaction, a destination account identifier (e.g., a public key of a destination wallet), (3) a transaction type identifier (i.e., a deposit (or transfer-in) or a withdrawal (or transfer-out) or redemption or recharge of use counter value), and (4) an identifier of the object being transferred or subjected to a change (e.g., an NFT identifier).

Figure 2:
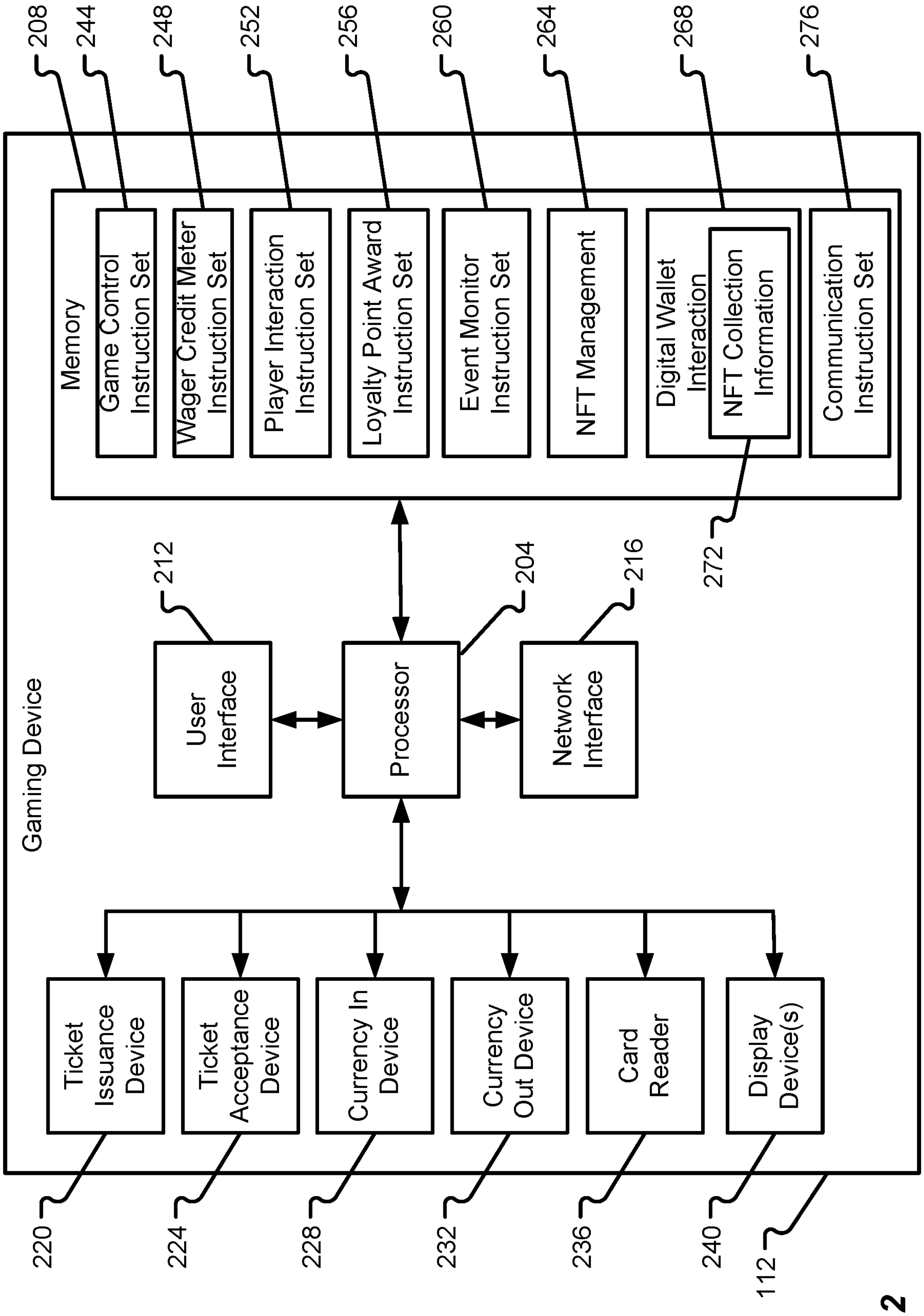
FIG. 2 is a block diagram depicting a gaming device in accordance with embodiments of the present disclosure.

With reference to FIG. 2, additional details of the components that may be included in a gaming device 112 will be described in accordance with at least some embodiments of the present disclosure. The illustrated gaming device 112 may correspond to an example of gaming device 112*a*, gaming device 112*b*, mobile device 120, and/or any other computational device depicted or described herein.

A gaming device 112 may correspond to a portable or non-portable device used for executing a gaming application or multiple different gaming applications without departing from the scope of the present disclosure. Non-limiting examples of a gaming device 112 include an EGM, a VGM, EGT, EGT player station, VR gaming machine, AR gaming machine, a mobile communication device (e.g., a smartphone, laptop, wearable device, etc.), a laptop, a PC, etc. The illustrative gaming device 112 depicted herein may include a support structure, housing or cabinet, which provides support for a plurality of displays, inputs, controls and other features of a conventional gaming machine. In some embodiments, a player 124 plays gaming device 112 while sitting, however, the gaming device 112 is alternatively configured so that a player can operate it while standing, moving, or sitting. The illustrated gaming device 112 can be positioned on the floor but can be positioned alternatively (i) on a base or stand, (ii) as a pub-style table-top game, (iii) as a stand-alone computational device on the floor of a casino with other stand-alone computational devices, or (iv) in any other suitable manner. The gaming device 112 can be constructed with varying cabinet and display configurations.

The gaming device 112 is shown to include a processor 204, memory 208, a user interface 212, and a network interface 216. In some embodiments, the processor 204 may correspond to one or many microprocessors, CPUs, microcontrollers, Integrated Circuit (IC) chips, or the like. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microcontroller, microprocessor, Central Processing Unit (CPU), a Graphics Processing Unit (GPU), or plurality of microprocessors that are configured to execute the instructions sets stored in memory 208. In some embodiments, the instruction sets stored in memory 208, when executed by the processor 204, may enable the gaming device 112 to provide gameplay functionality.

The nature of the network interface 216 may depend upon whether the network interface 216 is provided in cabinet- or player station-style gaming device 112 or a mobile gaming device 120. Examples of a suitable network interface 216 include, without limitation, an Ethernet port, a USB port, an RS-232 port, an RS-485 port, a NIC, an antenna, a driver circuit, a modulator/demodulator, etc. The network interface 216 may include one or multiple different network interfaces depending upon whether the gaming device 112 is connecting to a single gaming network 104 or multiple different types of gaming networks 104. For instance, the gaming device 112 may be provided with both a wired and wireless network interface 216 without departing from the scope of the present disclosure.

The user interface 212 may include a combination of user input devices and user output devices. For instance, the user interface 212 may include a display screen, speakers, buttons, levers, a touch-sensitive display, or any other device that is capable of enabling player 124 interaction with the gaming device 112. The user interface 212 may also include one or more drivers for the various hardware components that enable player 124 interaction with the gaming device 112.

The memory 208 may include one or multiple computer memory devices that are volatile or non-volatile. The memory 208 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc.

The memory 208 may be configured to store the instruction sets depicted in addition to temporarily storing data for the processor 204 to execute various types of routines or functions. The instruction sets can enable user interaction with the gaming device 112 and game play at the gaming device 112. Examples of instruction sets that may be stored in the memory 208 include a game control instruction set 244, wager credit meter instruction set 248, player interaction instruction set 252, loyalty point award instruction set 256, event monitor instruction set 260, an NFT management instruction set 264, a digital wallet interaction instruction set

268, and a communication instruction set 276. In addition to the instruction sets, the memory 208 may also be configured to store a random number generator or pseudorandom number generator (not shown) that is used by the game control instruction set 244, for example, to provide game outputs or support the game control instruction set 244 in generating such game outputs. The digital wallet interaction instruction set 268 is shown to include NFT collection information 272, which may include information describing one or more NFTs that are owned/possessed by a player 124 utilizing the gaming device 112. Alternatively or additionally, the NFT collection information 272 may include information describing how NFTs within the NFT collection can be earned, recharged or refreshed, and/or redeemed, and the benefits provided to the player owner upon NFT redemption, such as whether one or more of the NFTs in the NFT collection) unlock certain gameplay features of the game when earned and redeemed by the player 124.

In some embodiments, one or more of the components listed above, such as the loyalty point award instruction set and promotional rules instruction set, would likely be implemented in a System Management Information Base ("SMIB") device and not natively in an Electronic Gaming Machine ("EGM") (or gaming device). Some of the components may be partly or entirely located on the system-side. For example, the loyalty point award instruction set may be implemented as an SMIB function or natively in the EGM hardware and/or software.

In some embodiments, the game control instruction set 244, when executed by the processor 204, may enable the gaming device 112 to facilitate one or more games with the player(s) 124. In some embodiments, the game control instruction set 244 may include subroutines that receive electronic messages from player(s) and others comprising an indication of consideration (e.g., a wager, mini wager, side wager, etc.) for occurrence of a predicted level of player performance in the game, subroutines that stream a video of the game to gaming and personal gaming devices 112, 120 of other non-players or third parties, subroutines that create, maintain and update player profiles of the player(s) to the game, subroutines that generate, such as by a random number generator or pseudorandom number generator, an outcome of the game, subroutines that alter, modify, or select game or display operations or functions in response to loyalty point awards and cryptocurrency exchanges with players, subroutines that calculate whether an outcome of the game has resulted in a win or loss during the game, subroutines for determining winnings and award payouts for the player(s) and others in the event of a win, subroutines for exchanging communications with another device, subroutines for determining whether certain game events correspond to NFT-earning events, and any other subroutine useful in connection with facilitating gameplay at the gaming device 112, 120.

The wager credit meter instruction set 248, when executed by the processor 204, may enable the gaming device 112 to facilitate a tracking of activity at the gaming system 100. In some embodiments, the wager credit meter 248 may be used to store or log information related to various player 124 activities and events that occur at the gaming device 112. The types of information that may be maintained in the wager credit meter instruction set 248 include, without limitation, player information, available credit information, wager amount information, whether one or more NFTs have been earned during gameplay, whether one or more NFTs (or a collection of NFTs) have been used to unlock gameplay features, whether one or more NFTs (or a collection of NFTs) have been used to modify game mechanics or game rules, whether one or more NFTs (or a collection of NFTs) have been used to change bonuses and/or pay tables, and other types of information that may or may not need to be recorded for purposes of accounting for wagers placed at the gaming device 112 and payouts made for a player 124 during a game of chance or skill played at the gaming device 112.

In some embodiments, the wager credit instruction set 218 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 112, NFT collection activities, NFT utilization activities, NFT transactions (such as NFT redemptions, recharges, and sales, trades, and other transfers), and the like. In some embodiments, certain portions of the wager credit meter instruction set 248 may be updated in response to outcomes of a game of chance or skill played at the gaming device 112. In some embodiments, the gaming device 112 does not include a wager credit meter instruction set 248.

The player interaction instruction set 252 and event monitor instruction set 260, when executed by the processor 204, detect player activity at the gaming device 112 and notify the gaming server 116 of an instance of detected player 124 interaction, a type of player 124 interaction detected, and a timestamp associated with the player 124 interaction and enable the gaming device 112 to monitor operations of components of the gaming system 100 in response to interaction with players. The player gaming server 116 can use this input from the gaming device to determine loyalty point awards and determine a player's eligibility for earning, redeeming, or recharging NFTs. Input can include, for instance, detecting a gaming event that enables the player to earn and/or redeem and/or recharge an NFT. Types of player interaction with the gaming device 112 can comprise, for example, physical contact of an input of the gaming device by a player 124 and/or a current credit balance maintained by the credit meter instruction set 248 associated with the gaming device 112. Types of events sensed by the event monitor instruction set 260 include receipt of a payment from a player to recharge, redeem, or transfer an NFT, transfer of ownership of the NFT to a different player, occurrence of a predetermined game event or sequence of events during one or more games (e.g., occurrence of a lucky coin event), type of game played (e.g., slots, blackjack, keno, etc.), amount of game play (e.g., play of the game of chance by the player a predetermined number of times within a predetermined time interval), amount of money spent or bet on game play (e.g., play of the game of chance by the player using at least a minimum denomination), occurrence of a series of events or transactions involving a selected player at the game establishment, expiration of a specified time interval, the player being located in a selected physical location, a minimum or determined loyalty level of the player, a minimum or determined promotional credit balance of the player, and redemption of NFTs, ownership of NFTs (or a collection of NFTs).

The loyalty point award instruction set 256, when executed by the processor 204, applies the rules to the monitored operations to reward loyalty points to eligible players. The loyalty point award instruction set 256 further causes the processor 204 to increment and decrement loyalty point award balances for eligible players. For example, player 124 can be deemed to be eligible for loyalty points based upon amount of game play, type of game played (e.g., slots, blackjack, keno, etc.), amount of money spent or bet on game play, occurrence of a series of events or transactions involving a selected player at the game establishment, occurrence of a predetermined game event or sequence of events during one or more games (e.g., occurrence of a lucky coin event), redemption of NFTs, ownership of NFTs (or a collection of NFTs), occurrence of a system event (an event that is independent of a particular player's game play but involving multiple gaming devices or players (e.g., the game establishment realizing a determined threshold of gaming activity throughout the gaming system, occurrence of a determined time of day or day of week, and the like), and/or occurrence of a random event generated by the random number generator or pseudo random number generator (e.g., output of a predetermined random number entitles all players of a selected rank or class (e.g., gold or silver players) but not players of another rank or class (e.g., silver) to receive and loyalty points).

The NFT management instruction set 264, when executed by the processor 204, may enable the gaming device 112 to transfer NFTs to a player's 124 digital wallet, transfer ownership of NFTs from one player to another, recharge or refresh an NFT, change token state of an NFT, enable gameplay features and provide other benefits based on NFTs (or a collection of NFTs) owned by the player 124, interact with the digital wallet of the player to determine which NFTs (or collection of NFTs) are owned by the player 124, interact with the digital ledger 148, reference the digital ledger 148, and the like. Although depicted on the gaming device 112, it should be appreciated that some or all functionality of the NFT management instruction set 264 may be maintained at the gaming server 116, a gaming device 112, a mobile device 120, or the like. In other words, a player's 124 mobile device 120 may be equipped to support NFT management much like the gaming device 112.

The communication instruction set 276, when executed by the processor 204, may enable the gaming device 112 to communicate with the gaming server 116, a mobile device 120, the digital ledger 148, the database(s) 164, or the like. In some embodiments, the communication instruction set 276 may include instructions that enable the gaming device 112 to pair with a personal gaming mobile device 120 and establish a communication channel with the personal gaming mobile device via the pairing. As an example, the communication instruction set 276 may include instructions that enable NFC, Bluetooth®, Wi-Fi, or other types of communication protocols. It should be appreciated that the communication instruction set 276 may also be updated to reflect when a personal gaming mobile device is paired with the gaming device 112 and such pairing information may include addressing information for the personal gaming device and/or identification information associated with the player 124 of the personal gaming mobile device. Alternatively or additionally, the communication instruction set 232 may enable the gaming device 112 to identify a player 124 of the personal gaming device, identify a loyalty account associated with the player 124 of the personal gaming device, exchange information (e.g., send or receive) with a loyalty application operating on the personal gaming device, determine information regarding NFT(s) owned by the player 124 (e.g., stored in the player's 124 digital wallet 128) or combinations thereof. In some embodiments, the communication instruction set 276 may be configured to operate or drive the network interface 216 to facilitate direct or indirect communications with a personal gaming device.

While shown as separate instruction sets, it should be appreciated that any of the game control instruction set 244, wager credit meter instruction set 248, player interaction instruction set 252, loyalty point award instruction set 256, event monitor instruction set 260, NFT management 264, and communication instruction set 276 may correspond to a subroutine of the game control instruction set 244 without departing from the scope of the present disclosure.

The gaming device 112 is further shown to include a ticket issuance device 220, a ticket acceptance device 224, a currency in device 228, a currency out device 232, and a card reader 236. The ticket issuance device 220 may be configured to print physical tickets, vouchers, or the like. The ticket acceptance device 224 may be configured to receive, scan, and/or recognize information from an input physical ticket, voucher, or cash. In some embodiments, the ticket issuance device 220 and ticket acceptance device 224 may operate in concert with a common piece of hardware that both accepts and produces physical tickets, vouchers, or the like. Tickets or vouchers printed by ticket issuance device 220 and recognizable by the ticket acceptance device 224 may correspond to physical lottery tickets, casino vouchers, paper coupons, and the like. Alternatively or additionally, the ticket issuance device 220 and/or ticket acceptance device 224 may be connected to ticket or cash reading hardware. In such an embodiment, the ticket issuance device 220 and ticket acceptance device 224 may operate as a driver and/or firmware component for the card reader.

Similarly, the currency in device 228 and currency out device 232 may include or operate in concert with a coin slot or any other type of coin delivery mechanism. The currency in device 228 and currency out device 232 may include hardware, drivers, or firmware that facilitate receiving or distributing tokens, coins, chips, etc. In some embodiments, the currency in device 228 may be configured to determine an amount of coins (an amount of tokens, an amount of chips, etc.), input at the coin slot and convert the values into credits for playing games. The currency out device 232 may correspond to hardware and software configured to output coins, tokens, chips, etc. if a player decides to cash out or convert playing credits back into coins, tokens, or chips, etc.

The card reader 236 may include hardware and/or software configured to read or accept any type of card, or portable credential (e.g., NFC, Bluetooth, Wi-Fi, etc.). In some embodiments, the card reader 236 may include hardware and/or software that enable contactless reading of a card, token, or portable credential. In some embodiments, the card reader 236 may include hardware and/or software that enable contact-based reading of a card, token, or portable credential (e.g., magstripe, chip reader, electrodes, card-receiving slot, etc.). It should be appreciated that the card reader 236 may be configured to receive and reader a card or portable credential, token, in any type of format (e.g., portable plastic card, magstripe card, key fob, etc.). It should also be appreciated that the card reader 236 may be configured to write information or data onto a card or portable credential. Furthermore, in some embodiments, the card reader 236 may be configured to read a player loyalty card in the form of a plastic credit-card shaped credential. In some embodiments, the card reader 236 may enable communications with a loyalty application operating on a player's personal gaming device.

The gaming device 112 may include one or more display devices 240 configured to render information, live video, communications windows, wagering interface windows, games, interactive elements, and/or other visual output to one or more display screens. The gaming device 112 may include one or more display controllers configured to control an operation of the display device 240. This operation may include the control of input (e.g., player input via the user interface 212, command input via the instruction sets in memory 208, combinations thereof, etc.), output (e.g., display, rendered images, visual game behavior, etc.) and/or other functions of the display device 240.

In an embodiment, the display device 240 comprises one or more display screens that are configured to selectively activate pixels and/or display elements to render one or more games, windows, indicators, interactive elements, icons, characters, lights, images, etc. Non-limiting examples of the display screen may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens may be separated into a main display and a secondary display. In an embodiment, the display device 240 comprises head-mounted displays worn by the players 124 to view the augmented reality, augmented virtuality, or virtual reality computer-generated game environments.

The display device 240 may include a display driver, a power supply, an input/output, and/or other components configured to enable operation of the display device 240. The display driver may receive commands and/or other data provided by the processor 204 and one or more of the instruction sets in memory 208. In response to receiving the commands, the display driver may be configured to generate the driving signals necessary to render the appropriate images to the display screen. The power supply may provide electric power to the components of the display device 240. In some embodiments, the power supply may include a transformer and/or other electronics that prevent overloading, condition power signals, and/or provide backup power to the display device 240. The input/output may correspond to one or more connections for receiving or exchanging information and/or video from components of the gaming device 112. The input/output may include an interconnection to the network interface 216. By way of non-limiting example, the input/output may include a high-definition multimedia interface (HDMI) input, Ethernet, composite video, component video, H.264, or other video connection.

Figure 3:
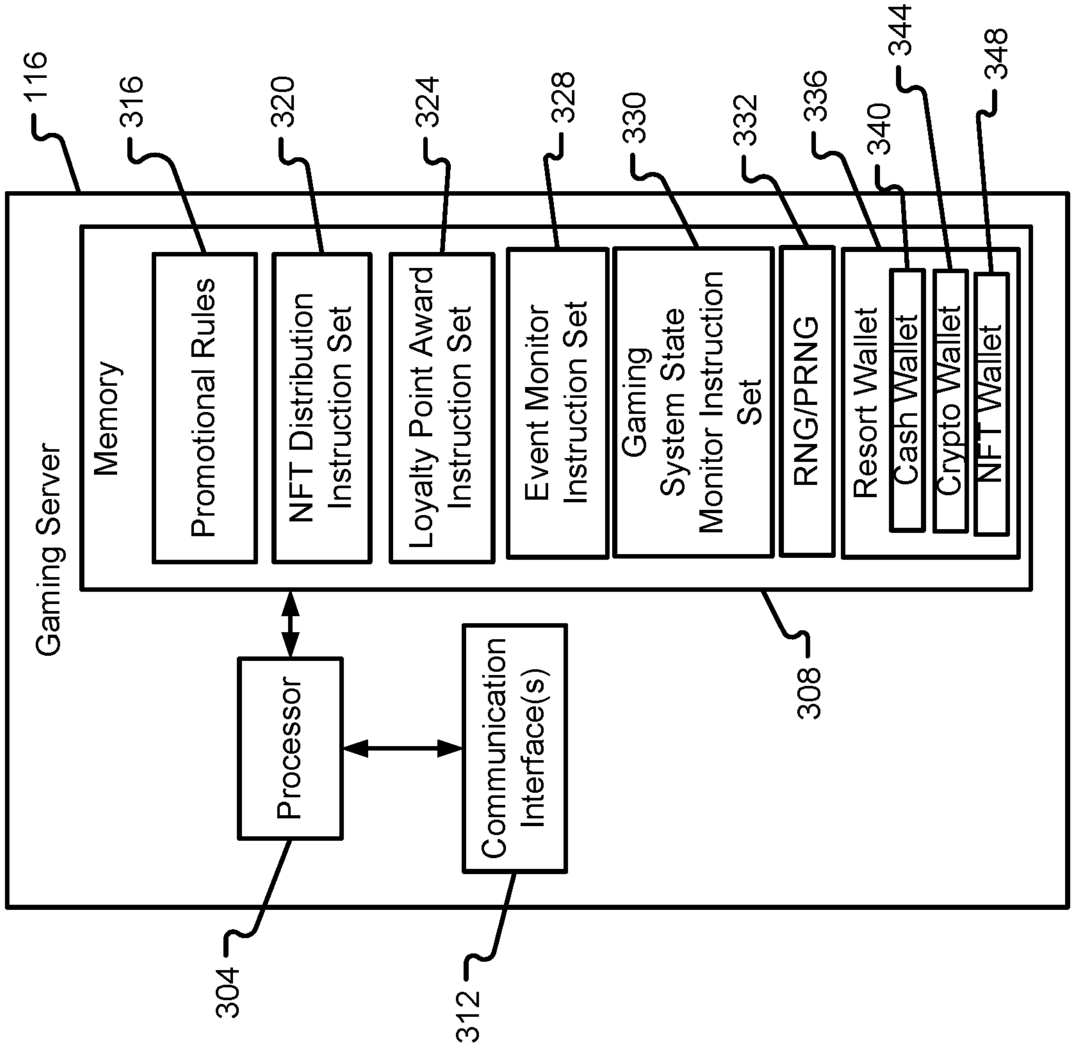
FIG. 3 is a block diagram depicting a gaming server in accordance with embodiments of the present disclosure.

With reference now to FIG. 3, additional details of a gaming server 116 will be described in accordance with embodiments of the present disclosure. The gaming server 116 is shown to include a processor 304, memory 308, and one or more communication interfaces 312. These resources may enable functionality of the gaming server 116 as will be described herein. For instance, a communication interface 312 may provide the gaming server 116 with the ability to send and receive communication packets or the like over the gaming network 104. The communication interface 312 can also facilitate communications with the mobile devices 120 via the communication network 108. The communication interface 312 may be provided as a network interface card (NIC), a network port, drivers for the same, and the like. Communications between the components of the gaming server 116 and other devices connected to the gaming network 104 may all flow through the communication interface 312.

The processor 304 may correspond to one or many computer processing devices. The processor 304 may be configured to execute one or more instruction sets stored in memory 308. Upon executing the instruction sets stored in memory 308, the processor 304 enables various authentication functions of the gaming server 116.

The memory 308 may include any type of computer memory device or collection of computer memory devices. The memory 308 may include volatile and/or non-volatile memory devices. Non-limiting examples of memory 308 include Random Access Memory (RAM), Read Only Memory (ROM), flash memory, Electronically-Erasable Programmable ROM (EEPROM), Dynamic RAM (DRAM), etc.

The illustrative instruction sets that may be stored in memory 308 include, without limitation, promotional rules 316, an NFT distribution instruction set 320, a loyalty point award instruction set 324, event monitor instruction set 328, RNG/PRNG 332, and digital resort wallet 336. Functions of the gaming server 116 enabled by these various instruction sets will be described in further detail herein. It should be appreciated that the instruction sets depicted in FIG. 3 may be combined (partially or completely) with other instruction sets or may be further separated into additional and different instruction sets, depending upon configuration preferences for the gaming server 116. Said another way, the particular instruction sets depicted in FIG. 3 should not be construed as limiting embodiments described herein. Although not depicted, the gaming server 116 may include instructions that enable a processor to store data into the database 164 and retrieve information from the database 164. Alternatively or additionally, the database 164 or data stored therein may be stored internal to the gaming server 116 (e.g., within the memory of the server 116 rather than in a separate database).

In some embodiments, the promotional rules 316 may correspond to rules that are referenced by other instruction sets in the gaming server 116 and/or by other gaming devices 112, 120. The promotional rules 316 may include rules associated with earning recharging, and/or redeeming NFTs as well as instructions defining how to mint NFTs for particular games or game symbols. In some embodiments, the promotional rules 316 may cooperate with the NFT distribution instruction set 320 to support the distribution of NFTs and collections of NFTs to different players 124 utilizing different types of devices. As an example, the NFT distribution instruction set 320 may refer to the promotional rules 316 to determine whether and when NFTs or NFT collections can be transmitted to digital wallets 128, 132 of players 124. The NFT distribution instruction set 320 may retrieve rules associated with earning, recharging, and/or redeeming NFTs from the promotional rules 316, then depict such rules as part of a player's 124 digital wallet 128, 132.

In some embodiments, NFT collections may be displayed in a digital wallet 128, 132 of a player 124 with a display parameter of an icon associated with the NFT being related directly or indirectly to a value of the NFT use counter and/or token state. For example, a display or presentation parameter in the metadata (e.g., icon or image size, color, color intensity or shading (e.g., transparency, semi-transparency, shading, shadowing, and highlighting), dotted lines, alternative coloring schemes, printed text indicators (e.g., a number showing the use counter value, a dial or other indicator pointing to or indexed with a current use counter value), or other presentation or display parameter) can change based on a current value of the use counter or token state such that the icon or image associated with the NFT has a first appearance when the use counter has a first value or the first NFT token state and a second different appearance when the use counter has a second value or the second NFT token state. For example, the icon can comprise an image of a vessel containing a liquid such as water with the liquid level being an indicator of the current value of the use counter. In another example, the icon can comprise the image of a dial or bar or timer with a current value indicated by the image being associated with a current value of the use counter. In some applications, the value of the use counter is embedded or encoded in graphical presentation information associated with the NFT such that an appearance of an NFT icon indicates a current value of the use counter.

In some embodiments, the use counter value and other NFT metadata is embedded in the icon graphics and code therefor. For example, the metadata can be incorporated in the file description of the icon Joint Photographic Experts Group or JPEG or encoded into the pixels of the graphical image of the icon. As will be appreciated, JPEG is a graphic image file compressed with lossy compression using the standard developed by the ISO/IEC Joint Photographic Experts Group. The image itself could therefore transmit the encoded or embedded metadata information. The icon graphics and associated code can be stored in a content server that is connected or linked to the block in the digital ledger comprising the smart contract and metadata.

The event monitor instruction set 328, when executed by the processor 304, may be configured to monitor game events as they occur at various nodes of the system 100. As described above, and without limitation, the event monitor instruction set 328 may monitor gameplay for the occurrence of a game event that corresponds to an NFT-earning, recharging, or redeeming event. If an NFT-earning, recharging, or redeeming event is detected within a game (according to promotional rules 316), then the event monitor instruction set 328 may notify the NFT distribution instruction set 320 of which device had the NFT-earning event and which NFT is eligible for redemption by the player 124 of the device.

The gaming system state monitor instruction set 330, when executed by the processor 304, may be configured to determine a current state of the gaming system for purposes of dynamically changing one or more promotional rules 316 when the gaming system is in a predetermined state. Examples of gaming system state include, without limitation, occurrence of a system event (an event that is independent of a particular player's game play but involving multiple gaming devices or players (e.g., the game establishment realizing a determined threshold of gaming activity throughout the gaming system, occurrence of a determined time of day or day of week, and the like)), occupancy levels of various gaming devices at selected locations within the casino premises (such that players engaging with gaming devices in lower occupancy areas are preferentially awarded NFT recharge or redemption opportunities compared to players playing gaming devices in higher occupancy areas), occupancy levels of various types of gaming devices within the casino premises (such that players engaging with gaming devices of a first type having lower occupancy are preferentially awarded NFT recharge or redemption opportunities compared to players playing gaming devices of a second type having higher occupancy), and/or occurrence of a random event generated by the random number generator or pseudo random number generator (e.g., output of a predetermined random number entitles NFTs of all players of a selected rank or class (e.g., gold or silver players) but not players of another rank or class (e.g., silver) to redeem or recharge NFTs).

The random number generator or pseudorandom number generator (RNG/PRNG) 332 is used to generate a random event as noted above. The RNG/PRNG 332 generates a distribution of numbers or game symbols (the random number value) that are not reasonably predictable by a random chance. Random number generators can be truly random hardware random generators (HRNGS), which generate random numbers as a function of current value of some physical environment attribute that is constantly changing in a manner that is practically impossible to model, or pseudo-random number generators (PRNGs), which generate numbers that look random, but are actually deterministic, and can be reproduced if the state of the PRNG were known. In some applications, the RNG/PRNG 332 uses computational algorithms that can produce long sequences of apparently random results, which are in fact determined by a shorter initial value, known as a seed value or key.

The loyalty point award instruction set 324 may be similar or identical to the loyalty point award instruction set 256 depicted and described in connection with FIG. 2. Illustratively, the loyalty point award instruction set 324 may cooperate with the loyalty point award instruction set 256 to determine if different NFTs or NFT collections or NFT redemption benefits are available to a player 124 based on that player's 124 loyalty status. In some embodiments, different NFTs or NFT collections may be earnable or redeemable by a player 124 depending upon the player's 124 loyalty status. Players 124 without a loyalty status may only be eligible to earn and redeem a first NFT or collection of NFTs whereas players 124 having certain higher loyalty status may be eligible to earn and redeem the first NFT or collection of NFTs as well as other NFTs and collections of NFTs.

In one embodiment, the RNG/PRNG 332 is a PRNG, which constantly generates a sequence of simulated random numbers, at a rate of hundreds or perhaps thousands per second. As soon as a "play" button is pressed or other game initiation is received from the player or a predetermined event occurs, the most recent random number is used to determine the result. This means that the result varies depending on exactly when the game is played. In other embodiments, the RNG/PRNG 332 is a cryptographic random number generator.

In some embodiments, the resort wallet 336 may be similar or identical to the digital resort wallet 132. The resort wallet 336 may include a cash wallet set of data structures 340 that tracks a cash balance and a cryptocurrency wallet set of data structures 344 that tracks cryptocurrency balances not only collectively for the gaming system 100 but also individually for each player's account managed by the gaming system 100. The resort wallet 336 may further include an NFT wallet 348, which tracks which NFT(s) are possessed by players 124, whether NFTs have been redeemed or not, whether players 124 are eligible to earn and/or redeem particular NFTs, whether an NFT or collection of NFTs are active or expired (e.g., benefits associated with NFTs in the NFT collection enable gameplay features or not), etc. It should be appreciated that currency in the cash wallet 340 and/or cryptocurrency wallet 344 may be used to purchase, acquire, recharge, or transfer one or more NFTs 348. Alternatively or additionally, one or more NFTs in the NFT wallet 348 may be transferred to other players 124 or back to the casino operator in exchange for credit in the cash wallet 340 and/or cryptocurrency in the cryptocurrency wallet 344. When cash or cryptocurrency is moved from a central resort wallet to a player's wallet, the appropriate data structures in each set of data structures are updated to reflect the transfer.

Figure 4:
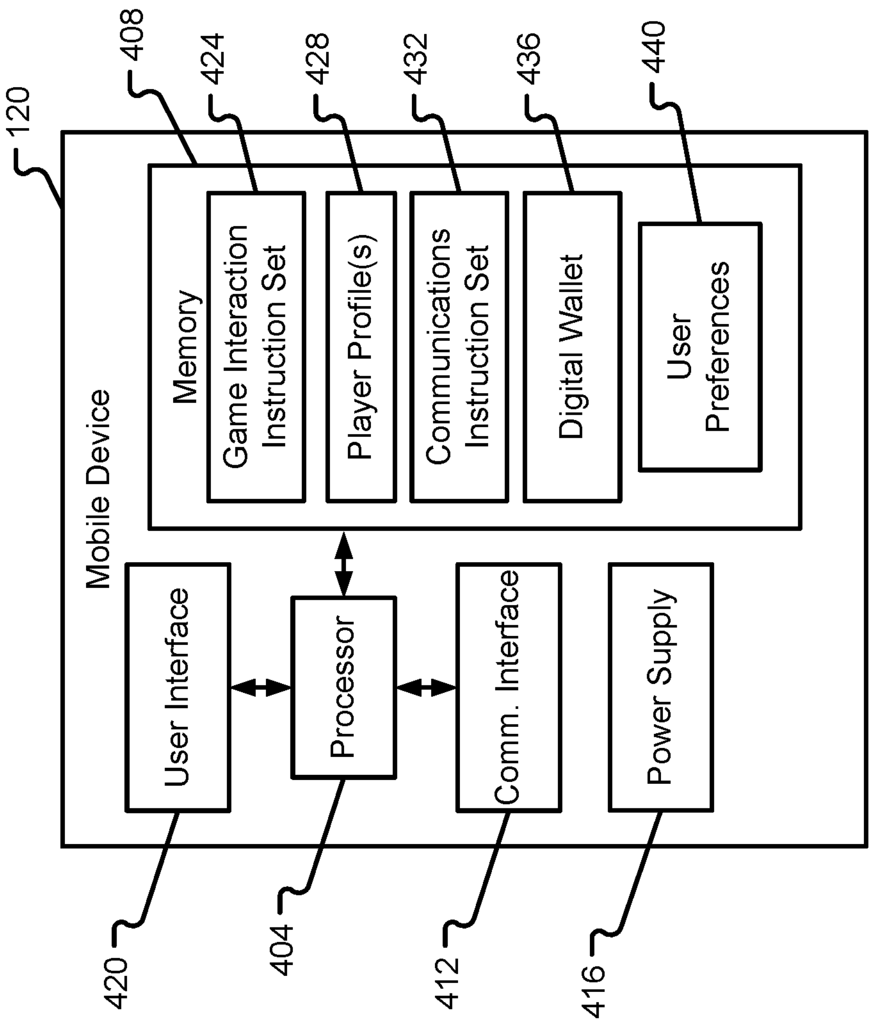
FIG. 4 is a block diagram depicting a mobile device in accordance with embodiments of the present disclosure.

With reference now to FIG. 4, additional details of the components that may be included in a mobile device 120 will be described in accordance with at least some embodiments of the present disclosure. Again, components of the mobile device 120 may be similar or identical to components of a gaming devices 112 and a mobile device 120 may be utilized as a gaming devices 112 in some embodiments.

The mobile device 120 is shown to include a processor 404, memory 408, a communication interface 412, and a user interface 420. In some embodiments, the processor 404 may be similar or identical to any of the other processors 204, 304 depicted and described herein and may correspond to one or many microprocessors, CPUs, GPUs, microcontrollers, Integrated Circuit (IC) chips, or the like. The processor 404 may be configured to execute one or more instruction sets stored in memory 408. In some embodiments, the instruction sets stored in memory 408, when executed by the processor 404, may enable the mobile device 120 to provide gameplay functionality, interact with gaming machines 112, pair with gaming machines 112, redeem NFTs, recharge NFTs, transfer NFTs, interact with a digital wallet 436, or any other type of desired functionality.

The communication interface 412 may be similar or identical to the network interface 216 and/or communication interfaces 312 depicted and described herein. The nature of the communication interface 412 may depend upon the type of communication network 108 for which the mobile device 120 is configured. Examples of a suitable communication interfaces 412 include, without limitation, a WiFi antenna and driver circuit, a Bluetooth antenna and driver circuit, a cellular communication antenna and driver circuit, a modulator/demodulator, etc. The communication interface 412 may include one or multiple different network interfaces depending upon whether the mobile device 120 is connecting to a single communication network 108 or multiple different types of communication networks. For instance, the mobile device 120 may be provided with both a wired communication interface 412 and a wireless communication interface 412 without departing from the scope of the present disclosure.

The user interface 420 may include a combination of a user input and user output device. For instance, the user interface 420 may include a display device, a microphone, a speaker, a haptic feedback device, a light, a touch-sensitive display, a button, or a combination thereof. The user interface 420 may also include one or more drivers for the various hardware components that enable user interaction with the mobile device 120.

The memory 408 may be similar or identical to other memory 208, 308 depicted and described herein and may include one or multiple computer memory devices that are volatile or non-volatile. The memory 408 may be configured to store instruction sets that enable player interaction with the mobile device 120 and that enable game play at the mobile device 120. Examples of instruction sets that may be stored in the memory 408 include a game interaction instruction set 424, player profile(s) 428, a communication instruction set 432, a digital wallet 436, and user preferences 440. In addition to the instruction sets, the memory 408 may also be configured to store data that is useable by the various instruction sets. Examples of such data that may be stored in memory 408 include, without limitation, contents of a digital wallet 436 (e.g., NFTs), instructions for interacting with a digital ledger 148, and the like.

In some embodiments, the game interaction instruction set 424, when executed by the processor 404, may enable the mobile device 120 to facilitate one or more games of chance or skill and produce interactions between the player and the game of chance or skill. In some embodiments, the game interaction instruction set 424 may include subroutines that present one or more graphics to the player 124 via the user interface 420, subroutines that calculate whether a particular wager has resulted in a win or loss during the game of chance or skill, subroutines for determining payouts for the player in the event of a win, subroutines for identifying NFT-earning events, subroutines for reporting NFT-earning events, subroutines for updating game rules and/or pay tables based on NFTs owned by a player 124 of the game, subroutines for exchanging communications with another device, such as the gaming server 116 and/or gaming device 112, subroutines for determining bonus gameplay opportunities during game play, and any other subroutine useful in connection with facilitating game play at the mobile device 120 and/or gaming device 112.

The player profile(s) 428 include a variety of player-specific data structures including player identification and login credentials. The player profile(s) 428 may also include user preferences 440, although the user preferences 440 are depicted as separate from the player profile(s) 438. The player profile(s) 428 may further include player loyalty status, an indication of which NFTs (or collection of NFTs) are owned by the player 124, etc.

The cryptocurrency wallet 154 comprises data structures related to the player's cryptocurrency wallet, including private and public keypair and seed used to generate the keys.

The communication instruction set 432, when executed by the processor 404, may enable the mobile device 120 to communicate via the communication network 108. In some embodiments, the communication instruction set 432 may be similar or identical to the communication instruction set 276 and may be particular to the type of communication network 108 used by the mobile device 120. As an example, the communication instruction set 432 may be configured to enable cellular, WiFi, and/or Bluetooth communications with other devices. The communication instruction set 432 may follow predefined communication protocols and, in some embodiments, may enable the mobile device 120 to remain paired with a gaming machine 112 as long as the mobile device 120 is within a predetermined proximity (e.g., 20-30 feet, an NFC communication range, or a Bluetooth communication range) and paired with the gaming machine 112. In some embodiments, the communication instruction set 432 enables a mobile device application of the mobile device to negotiate a secure, authenticated connection with the proper functionality, versions and security settings.

The user preferences 440 may correspond to gaming or wager preferences that are desired by the player 124 of the mobile device 120. In some embodiments, the user preferences 436 may comprise rules for automatically (or non-automatically) recharging or redeeming an NFT in response to an event occurring during a game. The gaming device 112 and mobile device 120 may be configured to communicate with one another and, in some embodiments, the mobile device 120 may provide some or all of the user preferences 436 to the gaming device 112 for use during a game play session or at least until the user 124 leaves the gaming device 112 (e.g., as determined by the mobile device 120 leaving the predetermined proximity of the gaming device 112).

The mobile device 120 is also shown to include a power supply 416. The power supply 416 may correspond to an internal power supply that provides AC and/or DC power to components of the mobile device 120. In some embodiments, the power supply 416 may correspond to one or multiple batteries. Alternatively or additionally, the power supply 416 may include a power adapter that converts AC power into DC power for direct application to components of the mobile device 120, for charging a battery, for charging a capacitor, or a combination thereof.

Figure 5:
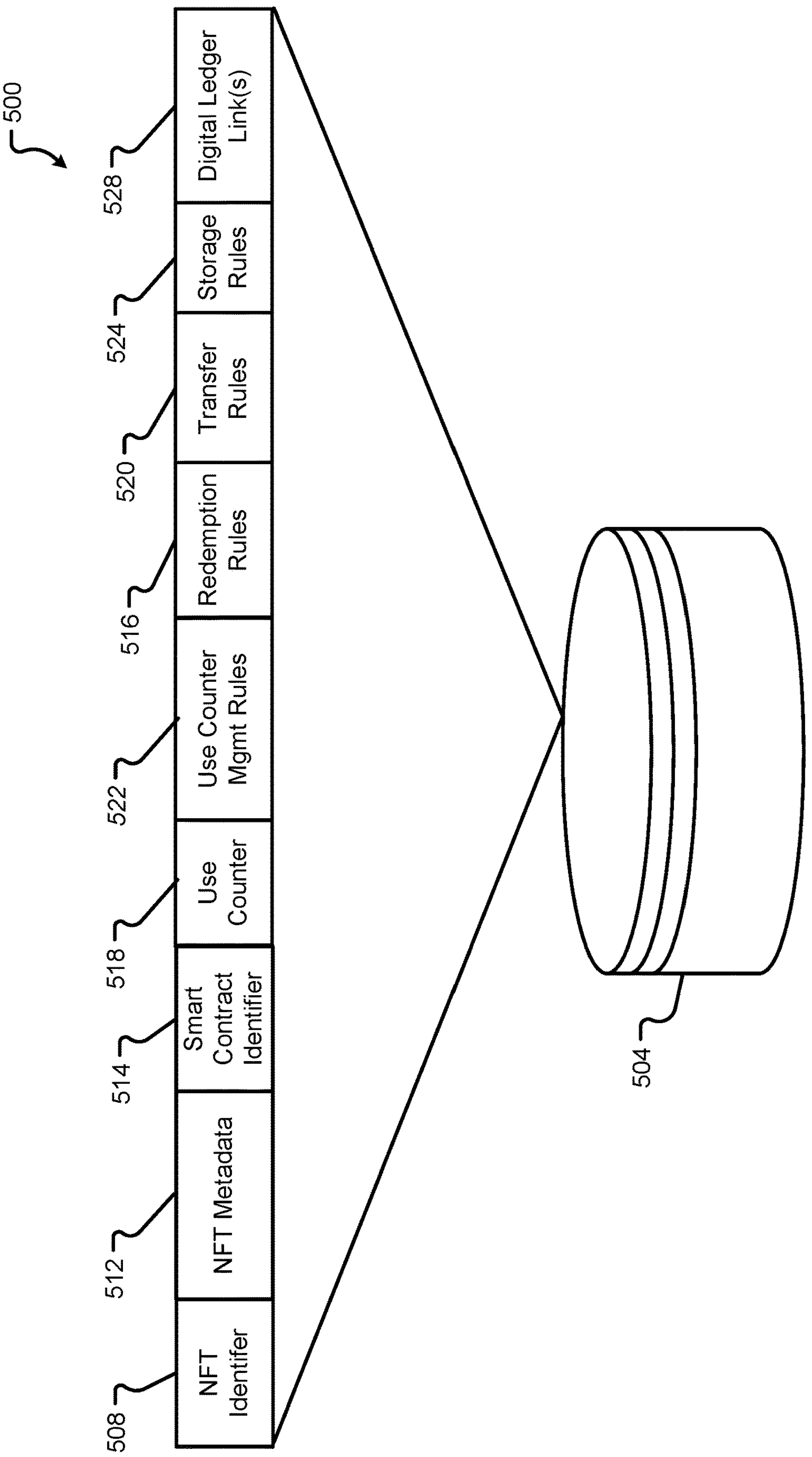
FIG. 5 is an illustrative data structure used for NFT management in accordance with embodiments of the present disclosure.

With reference now to FIG. 5, additional details of data that may be stored in a database 504 will be described in accordance with at least some embodiments of the present disclosure. The database 504 may be similar or identical to one or more of the database(s) 164. In some embodiments, the database 504 may be configured to store one or multiple data structures 500 that are used in connection with the management of NFTs and NFT collections. In some embodiments, the data stored in the data structures 500 may be stored for a plurality of different players, casinos, casino locations, games, devices, game types, etc. The data structures 500 may include a plurality of data fields that include, for instance, an NFT identifier field 508, an NFT metadata field 512, smart contract identifier field 514, use counter field 518, use counter management rules 522, redemption rules 516, transfer rules 520, storage rules 524, and/or digital ledger link(s) 528.

The NFT identifier field 508 may be used to store any type of information that identifies an NFT. In some embodiments, the NFT identifier field 508 stores one or more of NFT name information, an identification number for an NFT, information describing a type of the NFT, a game (or games) associated with the NFT, a string that uniquely identifies the NFT from other NFTs, information describing whether the NFT has been earned and/or redeemed by a player 124, an NFT electronic address to view the NFT, etc.

The NFT metadata field 512 may be used to store descriptive information for the specific token ID in the NFT identifier field 508. Such information can include, for example, the name of the NFT, the graphical image for rendering an icon associated with the NFT, a redemption benefit of the NFT, type of game associated with the NFT, requirements for earning, recharging, or redeeming the NFT, and any other attributes associated with the NFT. The NFT metadata field 512 may also store information describing gameplay feature(s) that can be unlocked or made available to a player 124 when the NFT has been redeemed by the player. Non-limiting examples of gameplay features may include at least one of a bonus game, a bonus spin, a different pay table, a payout, an adjusted reel spinning speed, a bonus award, a new symbol, a new game behavior, and a new game rule. The NFT metadata field 512 may be stored on-chain as part of the smart contract or off-chain or separately from the smart contract in linked storage. The benefits of representing metadata on-chain include that it permanently resides with the token, persisting beyond the lifecycle of any given application and it can change in accordance with on-chain logic.

The smart contract identifier field 514 provides a storage location address, such as by a linked data structure, of the smart contract for the identified NFT. As will be appreciated, the smart contract comprises code that is deployed to and runs on the blockchain. NFT smart contracts govern the issuance or creation of NFTs. NFTs can implement the ERC-721 standard, the ERC-1155 multi-token standard, or any suitable standard for NFT deployment. For example, existing standards such as ERC-20 require deployment of separate contracts per token type; the ERC-721 standard's token ID is a single non-fungible index and the group of these non-fungibles is deployed as a single contract with settings for the entire collection; and the ERC-1155 Multi Token Standard allows for each token ID to represent a new configurable token type, which may have its own metadata, supply and other attributes. In one embodiment, the ERC-721 defines a standard contract for representing and transacting NFTs. Commonly, smart contracts include information such as the number of tokens that the smart contract can create or mint, information about NFT ownership, mint function script, transfer function script, transfer approval function script, recharging function script, redemption function script, earning function script, and the like. The script is typically self-executing when called.

The use counter field 518 provides a current use counter value for the identified NFT and the use counter management rules field 522 defines rules for incrementing or decrementing the use value in response to appropriate inputs, such as NFT redemption, occurrence of predetermined events, NFT transfer, and the like. The use counter value determines token state for the NFT such that when the use counter value has one of a first set of values the NFT is in the first or inactive or non-redeemable state and when the use counter value has one of a second set of values the NFT is in the second or active or redeemable state.

The redemption rules field 516 may be used to store information describing conditions for earning and/or redeeming an NFT or NFT collection. Illustratively, and without limitation, the redemption rules may include a definition of non-game events or game events that need to occur to unlock the ability for a player 124 to earn and/or redeem an NFT or NFT collection. In some embodiments, a game event that may correspond to an NFT-earning event may include one or more of a 3-of-a-kind event, a 5-of-a-kind event, a jackpot event, a near-miss event, a cashing-in event, playing the game of chance for a predetermined amount of time, and a healthy player behavior event. It should be appreciated that other actions or non-game-events may also result in a player 124 becoming eligible to earn and redeem one or more NFTs. Illustrative, but non-limiting examples of actions that may be required of a player 124 to earn and redeem an NFT include movement actions required for the player 124 (e.g., requiring the player to physically move), enrollment actions required for the player 124 (e.g., requiring the player to open a loyalty account), healthy gaming actions (e.g., requiring the player to not play a game for a predetermined amount of time or for consecutive days), requiring the player 124 to utilize a particular denomination in a game, etc. The redemption rules may also define whether the player 124 is allowed to automatically redeem the NFT during gameplay or whether the player 124 must answer a prompt before redeeming the NFT.

The transfer rules field 520 and storage rules field 524 may be used to store information defining or controlling how an NFT may be stored, transferred, and/or redeemed. In some embodiments, the transfer rules field 520 may include information describing conditions required for a player 124 to redeem or transfer an NFT or NFT collection. In some embodiments, the transfer rules field 520 and/or storage rules field 524 may store information describing technical requirements of a digital wallet that must be met before an NFT or NFT collection can be stored or made eligible for storage.

The digital ledger link(s) field 528 may include information describing a location on the digital ledger 148 where a transaction associated with the NFT or NFT collection can be found. Typically, the digital ledger 148 is the same digital ledger that stores the smart contract corresponding to the NFT. In some embodiments, the digital ledger link(s) field 528 may include one or more blocks or references to blocks in a blockchain. The link(s) within the digital ledger link(s) field 528 may remain active as long as the NFT or NFT collection is active.

Figure 6:
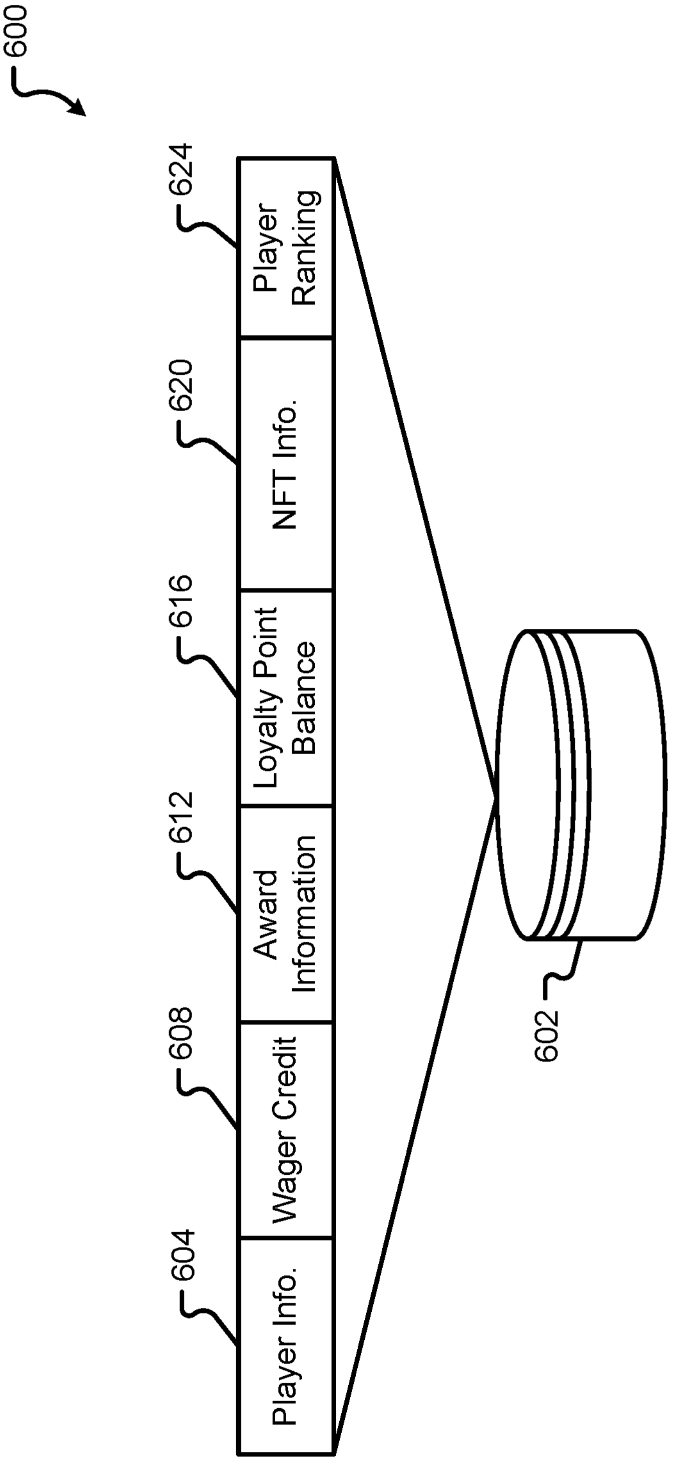
FIG. 6 is an illustrative data structure used in a player profile in accordance with embodiments of the present disclosure.

With reference now to FIG. 6, additional details of data that may be stored in a database 602 will be described in accordance with at least some embodiments of the present disclosure. The database 602 may be similar or identical to other databases 164, 504 and may be configured to store one or multiple data structures 600 that are used in connection with gaming activities of a player. In some embodiments, the data stored in the data structures 600 may be stored for a plurality of different player profiles or for a single player profile. The data structure 600 may include a plurality of data fields that include, for instance, a player information field 604, a wager credit field 608, award information and history field 612, loyalty points balance field 616, an NFT information field 620, and a player ranking field 624.

The player information field 604 may be used to store any type of information that identifies a player 124. In some embodiments, the player information field 604 may store one or more of username information for a player 124, contact information for the player (such as email address, phone number, social website webpage universal resource locator, and the like), password information for a player account, player status information, accommodations associated with the player 124, and any other type of customer service management data that may be stored with respect to a player 124.

The wager credit field 608 may be used to store data about a player's 124 available credit with the casino or a plurality of casinos. For instance, the wager credit field 608 may store an electronic record of available credit in the player's account and whether any restrictions are associated with such credit. The wager credit field 608 may further store information describing a player's available credit over time, wagers made over time, cash out events for the player, winning events for the player, and the like.

The award information and history field 612 may be used to store information describing awards that have been paid to the player 124 or that are available to be paid in response to particular events occurring within the gaming system 100. As a non-limiting example, the award information and history field 612 may be used to store electronic records for values of awards that are available to or have been paid to the player 124. The award information and history field 612 may further store information describing NFTs or NFT collections that have been awarded to and redeemed by a player 124. The award information and history field 612 may also store data related to awards, bonuses, mini bonuses, jackpots, side bets, etc. granted to the player 124. The award information and history field 612 may also indicate when such awards were granted to the player 124, whether the awards have been redeemed, whether the awards are being funded by a game of chance or skill, a mini bonus associated with an event, or a side bet award associated with the occurrence or nonoccurrence of an event.

The loyalty points balance field 616 may be used to store current loyalty point balances by type of loyalty points for the corresponding player 124. The loyalty point balance field 616 is incremented and decremented as loyalty points are added to and removed from the player's loyalty account. Information in the loyalty point balance field 616 may be used to update which NFTs or NFT collections or NFT-related operations (e.g., recharging or redemption) are available to a player 124.

The NFT information field 620 may be used to store information describing NFTs or NFT collections that are earnable and/or redeemable by a player 124. Alternatively or additionally, the NFT collection information field 620 may store information indicating which, if any, NFTs or NFT collections are possessed by a player 124. In some embodiments, the NFT collection information field 620 may include a link to a digital wallet of the player and contents of the digital wallet. The NFT collection information field 620 may also be referenced to determine which, if any, NFTs were previously owned by a player 124, but were then transferred.

The player ranking field 624 may be used to store a player ranking associated with the corresponding player 124. Player ranking may be measured in various ways. In one embodiment, the player ranking is based on membership in a platinum, gold, silver, or bronze class, with platinum being the highest value to the casino and bronze the lowest. In one embodiment, the player ranking is based on a proficiency level or performance rank in one or more gaming sessions. Other player loyalty classification schemes are possible depending on the application.

Figure 7:
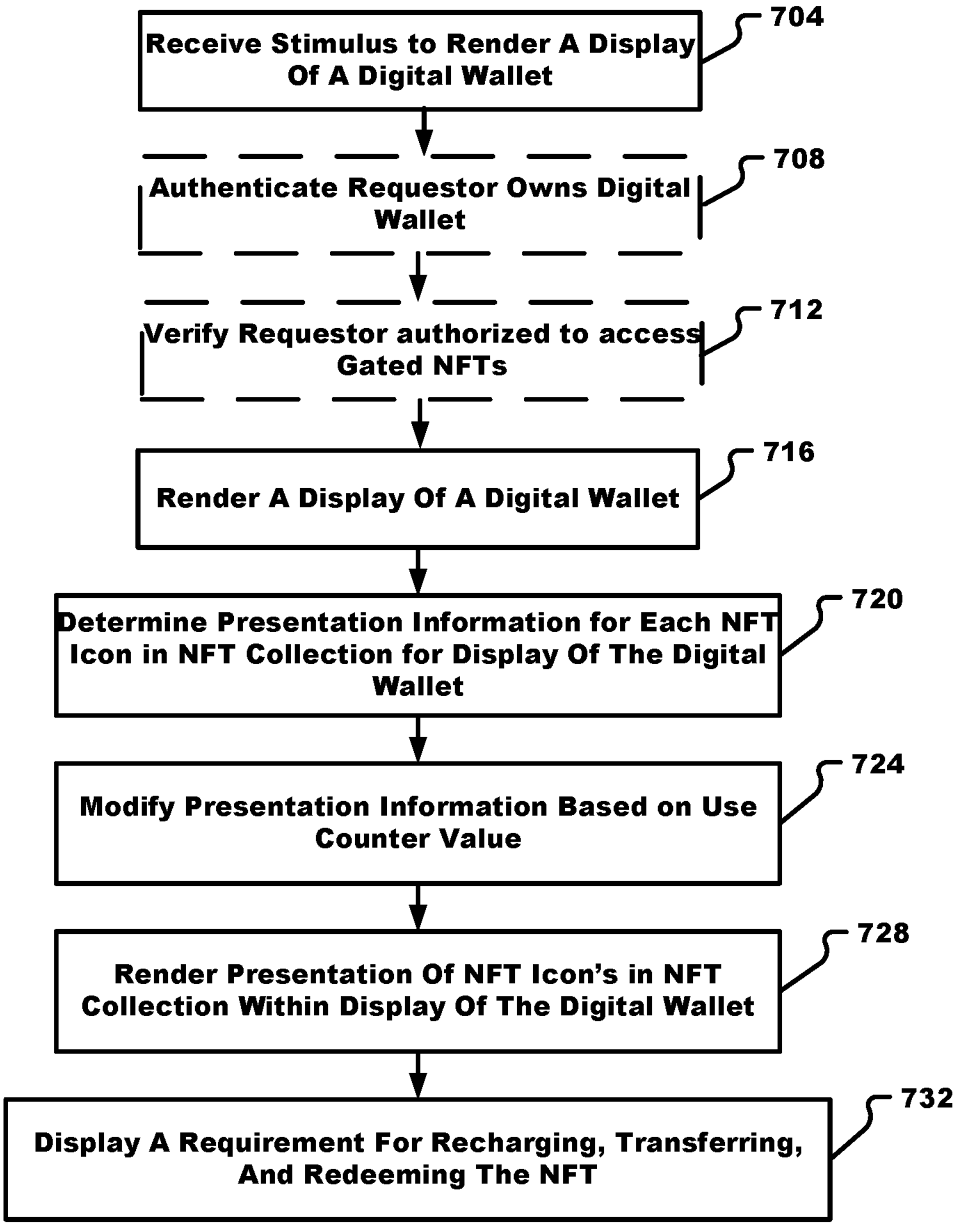
FIG. 7 is a flow diagram illustrating a method of rendering an NFT icon in accordance with embodiments of the present disclosure.

Referring now to FIG. 7, additional details of a method of accessing NFT information in an NFT collection will be described in accordance with embodiments of the present disclosure.

The method begins by receiving a stimulus to render a display of a digital wallet (step 704). The stimulus can be a request by a wallet owner or non-owner, such as a casino or gaming system.

In some embodiments particularly when the wallet owner is the requesting party, the method may include authenticating that the requestor owns the digital wallet (step 708). This can be done by many techniques. In some applications, authenticating ownership of the digital wallet by decrypting a hash of a selected message, generated using the player's private key, using a public key associated with an electronic address associated with the digital wallet, the public key being determined using the electronic address. The processor typically decrypts a hash of a selected message, generated from the player's private key, using the public key associated with the electronic address of the digital wallet.

In some embodiments particularly when a non-owner third party such as the casino is the requesting party, the method may include not only authenticating the identity of the requestor but also verifying that the requestor is authorized to access NFTs, specifically gated NFTs in the wallet (step 712). This may require the processor to request access to a digital ledger block comprising a smart contract associated with the gated NFT to verify that the requestor is entitled to access, such as via a browser, the gated NFTs in the wallet. As noted, access to the gated NFT may be restricted or limited to a class or type of player, the casino, or other specified entities.

The method can continue by the processor rendering a display of all or a portion of the digital wallet (step 716). The display of the digital wallet may include a presentation of contents of the digital wallet and the digital wallet may correspond to a personal digital wallet 128 of a player 124 or the digital wallet may correspond to a digital resort wallet 132. Part of the digital wallet 128, 132 may include an NFT wallet 160 in which icons or user interface objects of NFTs (earned and not earned) are depicted.

The method can continue by the processor determining presentation information for each NFT icon or image in an NFT collection for the digital wallet display (step 720). The presentation of the NFT collection 704 may include icons or user interface objects for one or multiple NFTs belonging to the NFT collection 704.

The method can continue by the processor modifying the presentation information based on a current value of the use counter (step 724). In some embodiments, each NFT depicted as being associated with the NFT collection 704 may include an indicator or have an appearance that indicates a current token state of the NFT (e.g., first token state indicating that the NFT is not eligible to be redeemed or second token state indicating that the NFT is eligible to be redeemed) and/or a current use counter value. The indicator may be a dial or other indicator pointing to or indexed with a current use counter value (e.g., a dial pointing to a current use counter value, a movable bar or other type of symbol ending at a current use counter value, and the like), a display or presentation parameter in the metadata (e.g., icon or image size, color, color intensity or shading (e.g., transparency, semi-transparency, shading, shadowing, and highlighting), dotted lines, alternative coloring schemes, printed text indicators (e.g., a number showing the use counter value, or other presentation or display parameter).

The method can continue by the processor rendering a presentation of NFT icons in an NFT collection within the display of the digital wallet (step 728).

The method can continue by the processor displaying a requirement for recharging, redeeming, and/or transferring each NFT in the collection (step 732). The method may present a hyperlink to a game of chance or NFT marketplace with which the non-redeemed NFT is associated to provide a mechanism for the player 124 to navigate on their mobile device 120 from their digital wallet 128 to the game of chance that can be played to recharge or redeem a particular NFT or the NFT marketplace to trade or sell the NFT to another player.

Figure 8:
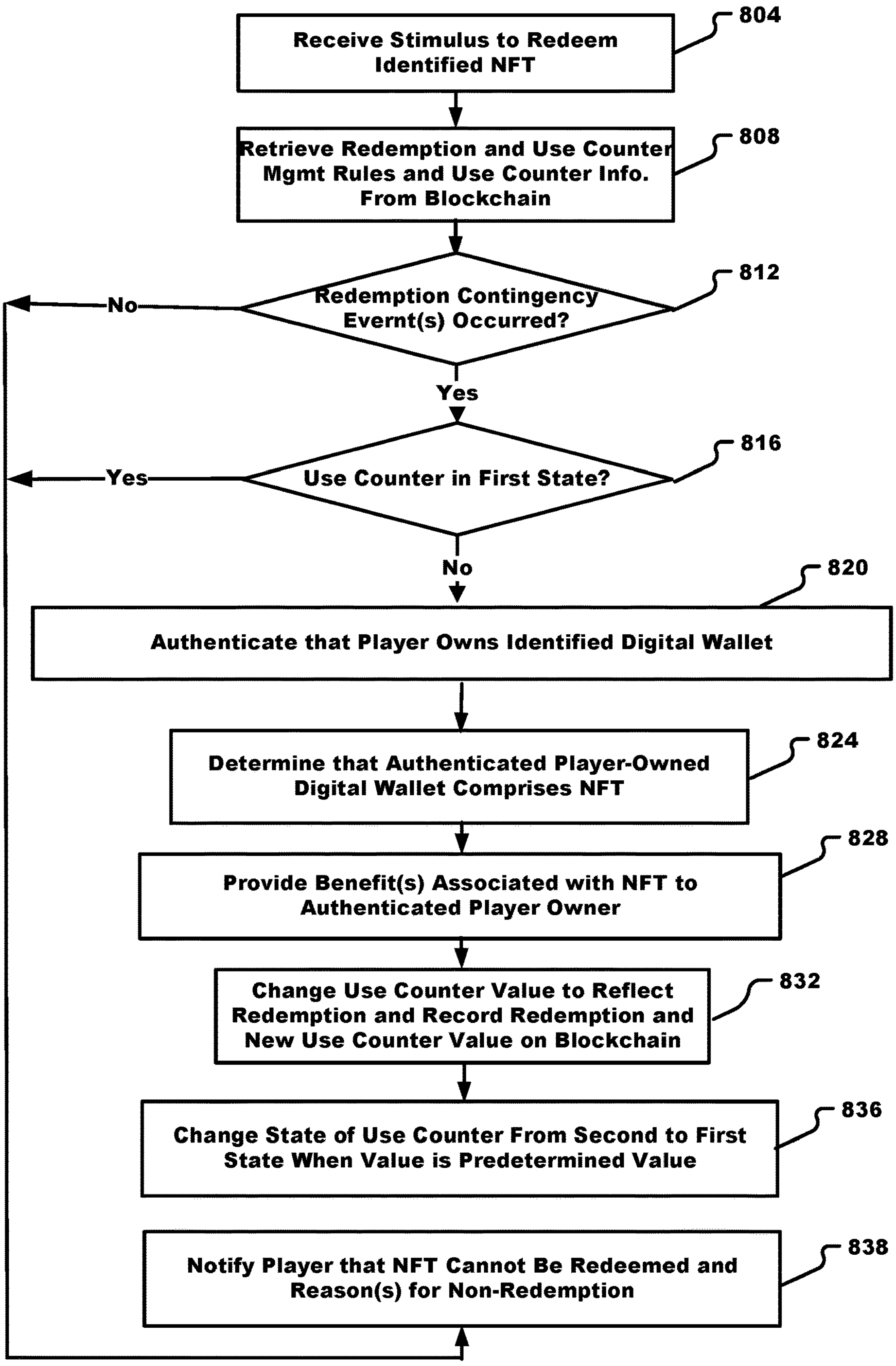
FIG. 8 is a flow diagram illustrating a method of redeeming NFTs in accordance with embodiments of the present disclosure.

Referring now to FIG. 8, additional details of a method of redeeming one or more NFTs in an NFT collection will be described in accordance with embodiments of the present disclosure.

The method begins by receiving a stimulus to redeem an identified NFT (step 804). The stimulus is typically a request from a mobile device or gaming device with which the player is interacting.

The method can continue by the processor retrieving redemption and use counter management rules and use counter information from the digital ledger or blockchain.

The method can continue by the processor determining from the gaming device 112, mobile device 120, gaming server 116, and other components of the gaming system whether redemption is contingent upon occurrence of an event and whether the contingency event has occurred (step 812). The contingency event can be, for example, receipt of a payment from a player, transfer of ownership of the gated NFT to a different player, occurrence of a gameplay event, play of the game of chance by the player a predetermined number of times within a predetermined time interval, play of the game of chance by the player using at least a minimum denomination, expiration of a specified time interval, the player being located in a selected physical location, a minimum or determined loyalty level of the player, a minimum or determined promotional credit balance of the player, and the gaming system being in a predetermined state. If the contingency event has not occurred the NFT is not eligible for redemption.

When any contingency event has occurred, the method can continue by the processor determining the use counter value and whether NFT is in the first token state in which the NFT is not eligible for redemption (step 816).

When the NFT is not in the first token state, the method can continue by the processor authenticating that the player owns the identified digital wallet comprising the NFT, such as by decrypting a hash of a selected message, generated from the player's private key, using a public key associated with an electronic address associated with the digital wallet (step 820).

The method may continue by the processor determining that the authenticated player-owned digital wallet comprises the NFT that is the subject of the stimulus (step 824). This can be determined by the processor querying the digital wallet or by referencing a digital ledger 148 on which NFT transactions are recorded. Based on the query of the player's 124 digital wallet and/or based on a query of the digital ledger 148, the device making the determination of the player's 124 NFT possessions may determine that the player 124 has not yet redeemed the NFT.

When the processor is able to confirm that the digital wallet contains the NFT, the method may continue by the processor providing the redemption benefits associated with the NFT to the player owning the digital wallet (step 828). When the benefits comprise a game-related benefit, a player profile associated with the player 124 may be updated to provide the player 124 with access to the additional gameplay feature when the player 124 next plays the associated game. In some embodiments, the associated game may correspond to a game of chance, a game of skill, or a hybrid game of chance and skill. Alternatively or additionally, the associated game may correspond to a bonus game of another game and the gameplay feature may only be usable within the execution of the bonus game.

The method can continue by the processor changing the use counter value to reflect redemption and causing the redemption and new use counter value to be recorded as a transaction in a block on the digital ledger or blockchain associated with the NFT (step 832).

Most NFT transactions are initiated using a digital wallet, or an application that provides an interface for the blockchain. In response to the digital wallet executing an NFT transaction, the blockchain collects NFT transaction information and enters it into an information-containing block. Once the block is full, the block can be closed and encrypted using an encryption algorithm, which creates a hexadecimal number or hash. The hash is entered into the following block header and encrypted with the other information in the block. Each node comprises a copy of the chain that is updated as fresh blocks are confirmed and added. This creates a series of blocks that are chained or linked together. Because there is no way to change a block, the only trust needed is at the point where a user or program enters data.

In some blockchain protocols, after a block is closed mining begins by multiple network nodes, or miners, trying to solve the hash. Each node generates a random hash except for the nonce, or a number used once. Every miner starts with a nonce of zero, which is appended to their randomly-generated hash. The nonce value is incremented if that number is not equal to or less than the target hash, and a new block hash is generated. This continues until a miner generates a valid hash. Once a block is closed, the NFT transaction is complete but the block is typically not considered to be confirmed until a predetermined number of other blocks have been validated. Other blockchains, such as Ethereum™, Solana™, IBM™, Tezos™, Stellar™, and Flow™ and other blockchains that support NFT deployment, follow different processes. For instance, the Ethereum network randomly chooses one validator from all users with ether staked to validate blocks, which are then confirmed by the network. Because of the decentralized nature of a blockchain, all transactions can be transparently viewed by either a personal node or a blockchain explorer allowing a network node to view NFT transactions.

The method can continue by the processor determining whether the change in use counter value causes a change of token state for the NFT from the second token state to the first token state when the use counter value is a predetermined value (step 838). If the token state has changed, the processor records the state change in database 504 such as in NFT metadata field 512 or use counter field 518 in connection with the NFT (step 838).

When the contingency event for redemption has not occurred or the use counter value is a predetermined value or NFT in the first state, the processor notifies the player that the NFT cannot be redeemed and the reasons for non-redemption (step 838).

Figure 9:
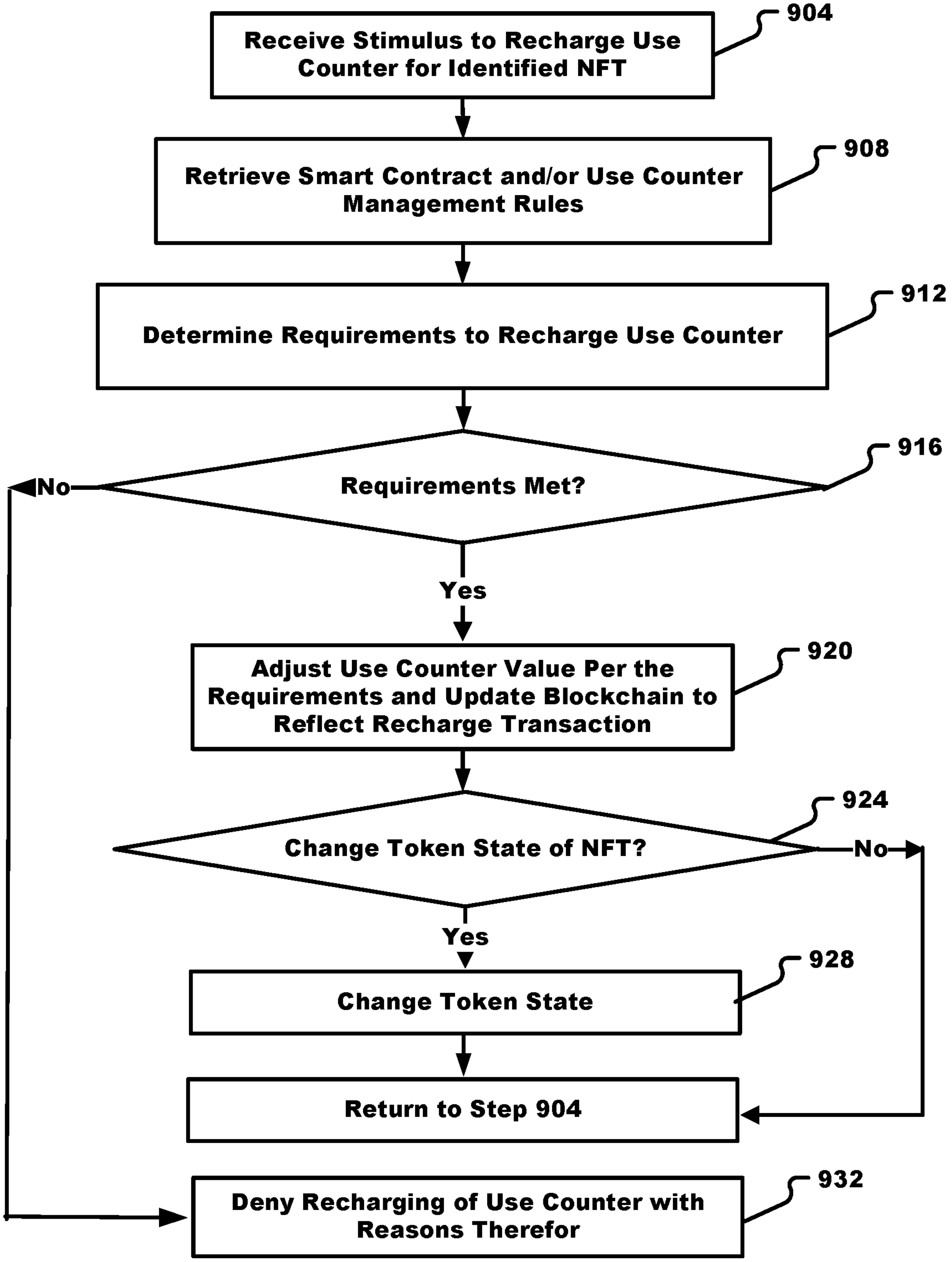
FIG. 9 is a flow diagram illustrating a method of recharging a use counter for an NFT.

Referring now to FIG. 9, additional details of a method of recharging the use counter value of an NFT will be described in accordance with embodiments of the present disclosure.

The method begins by receiving a stimulus to recharge a use counter for an identified NFT (step 904). This is typically by a request received from the player owning the digital wallet containing the NFT.

The method may then include retrieving from the digital wallet or blockchain the smart contract and/or use counter management rules (step 908).

The method can continue by the processor determining from the smart contract and/or use counter management rules the requirements to recharge the use counter (step 912).

The method may continue by the processor determining whether the requirements have been met (step 916). The requirements can be, for example, receipt of a payment from a player, transfer of ownership of the gated NFT to a different player, occurrence of a gameplay event (such as a jackpot or bonus award), play of the game of chance by the player a predetermined number of times within a predetermined time interval, play of the game of chance by the player using at least a minimum denomination, expiration of a specified time interval, the player being located in a selected physical location, a minimum or determined loyalty level of the player, a minimum or determined promotional credit balance of the player, and the gaming system being in a predetermined state.

When the requirements have been met, the method may continue by the processor adjusting the use counter value per the requirements and updating the digital ledger or blockchain to reflect the recharge transaction including the new use counter value (step 920).

The method may continue by the processor determining whether the change in use counter value causes a change in token state of the NFT (step 924).

When the change in use counter value causes a change in token state, the method may continue by the processor recording the state change in database 504 such as in NFT metadata field 512 or use counter field 518 in connection with the NFT (step 928).

After performing step 928 or when the token state is not changed, the method may return to step 904.

When the requirements are not met in step 916, the method may further include denying recharging of the use counter and notifying the player of the reasons for the dential (step 932).

Figure 10:
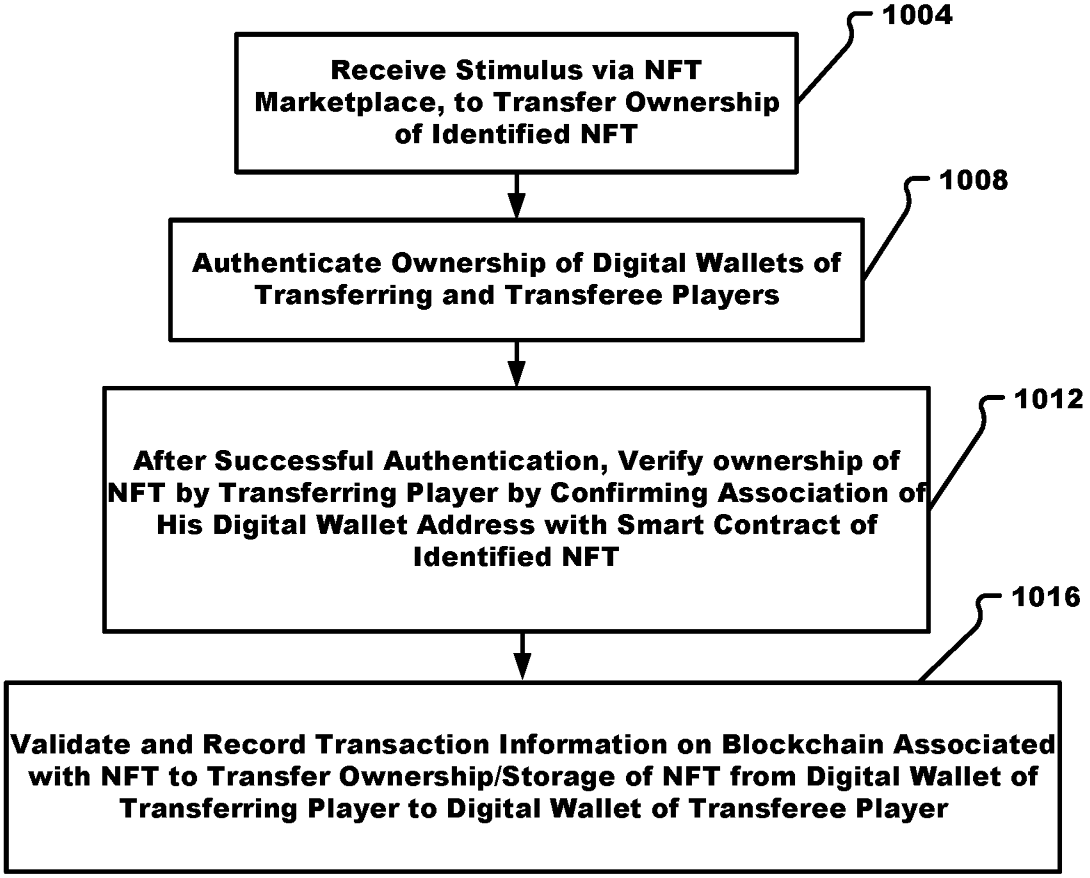
FIG. 10 is a flow diagram illustrating a method of recording an NFT transaction in accordance with embodiments of the present disclosure.

Referring now to FIG. 10, additional details of a method of transferring ownership of NFTs will be described in accordance with embodiments of the present disclosure.

The method may start by receiving a stimulus via an NFT marketplace indicating a desire to sell, purchase, trade or otherwise transfer ownership from a transferring player to a transferee player (step 1004). The stimulus may be a request to the NFT marketplace initiated by either player.

The method may continue by the processor authenticating ownership of the digital wallets of the transferring and transferee players, such as by the techniques noted above (step 1008).

After successful authentication, the method may continue by the processor verifying ownership of the NFT by the transferring player by confirming association of his or her digital wallet address with the smart contract of the identified NFT (step 1012).

The method may continue by the processor validating and recording the transaction information (e.g., transaction amount, wallet addresses of the transferring and transferee wallets, time and date) on the digital ledger or blockchain associated with the identified NFT thereby transferring ownership/storage of the NFT from the digital wallet of the transferring player to the digital wallet of the transferee player (step 1016).

In some embodiments, each title or ownership transfer of an NFT token may cause a use counter value to be adjusted. In other words, a number of title or ownership transfers may be limited to a predetermined number of instances or occurrences.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, RAM, ROM, EEPROM or Flash memory, an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A gaming system, comprising:

a processor; and computer memory coupled with the processor, the computer memory comprising data stored thereon that, when executed by the processor, causes the processor to:

monitor a plurality of gaming devices in the gaming system to determine a state of the gaming system that is independent of a player's game play;

receive, from a gaming device of a player of a game of chance, a request to redeem a Non-Fungible Token (NFT), the NFT providing a benefit from the gaming system available to an owner of the NFT;

determine that the state of the gaming system is a first predetermined state, the NFT being redeemable when the gaming system is in the first predetermined state but not a second predetermined state, wherein the first and second predetermined states each comprise one of a system event involving a plurality of gaming devices, a system event involving a plurality of players, an occupancy level of the plurality of gaming devices, and occurrence of a random event;

in response to the determination that the state of the gaming system is the first predetermined state, authenticate that the player owns a digital wallet identified by the player;

when the player is an authenticated owner of the digital wallet, determine from the digital wallet that the digital wallet contains the NFT; and when the digital wallet contains the NFT, provide the benefit to the player.

2. The gaming system of claim 1, wherein the NET is a gated NFT, wherein the benefit is available only to the owner of the gated NFT, wherein the NFT provided benefit comprises one of an additional gameplay feature, a gameplay setting, a gameplay award, membership in a player group, a player loyalty reward, participation in a non-game event, a promotional credit award, and a casino voucher, wherein the NFT provided benefit is defined by a smart contract associated with the gated NFT, wherein the digital wallet is stored in a mobile device of the player, wherein the request is transmitted from an Electronic Gaming Machine (EGM) to the mobile device, and wherein the mobile device is paired with the EGM.

3. The gaming system of claim 2, wherein the additional gameplay feature comprises one of a bonus game, a bonus spin, a different paytable, a payout, an adjusted reel spinning speed, a bonus award, a new symbol, a new game behavior, and a new game rule and wherein the processor authenticates ownership of the digital wallet by decrypting a hash of a selected message, generated using a player's private key, using a public key associated with an electronic address associated with the digital wallet, the public key being determined using the electronic address and wherein the processor initiates a request to a digital ledger associated with the NFT to record in a block provision of the NFT provided benefit to the player.

4. The gaming system of claim 1, wherein one of a smart contract and NFT metadata comprises a use counter, wherein the processor changes a value of the use counter for each redemption of the NFT, wherein, when the use counter has a predetermined value, the processor permits no further redemptions of the NFT, wherein the use counter corresponds to a displayed icon, and wherein the displayed icon comprises a display parameter having a value that depends on an NFT state determined by the use counter, and wherein in a first NFT state the display parameter has a first value and in a second NFT state the display parameter has a different second value.

5. The gaming system of claim 4, wherein the processor returns the value of the use counter to a prior value upon occurrence of a predetermined event, the predetermined event comprising one of receipt of a payment from a player, transfer of ownership of the NFT to a different player, occurrence of a gameplay event, play of the game of chance by the player a predetermined number of times within a predetermined time interval, play of the game of chance by the player using at least a minimum denomination, expiration of a specified time interval, the player being located in a selected physical location, a minimum or determined loyalty level of the player, a minimum or determined promotional credit balance of the player, and the gaming system being in the first predetermined state.

6. The gaming system of claim 1, wherein redemption of the NFT is in a first token state in the absence of occurrence of a predetermined event and in a second token state after occurrence of the predetermined event, the first token state preventing redemption of the NFT and the second token state enabling redemption of the NFT and the predetermined event comprising one of the predetermined event comprising one of receipt of a payment from a player, transfer of ownership of the NFT to a different player, occurrence of a gameplay event, play of the game of chance by the player a predetermined number of times within a predetermined time interval, play of the game of chance by the player using at least a minimum denomination, expiration of a specified time interval, the player being located in a selected physical location, a minimum or determined loyalty level of the player, a minimum or determined promotional credit balance of the player, and the gaming system being in the first predetermined state.

7. The gaming system of claim 1, wherein the NFT is a gated NFT, wherein the benefit is available only to the owner of the gated NFT, wherein the gated NFT is associated with a smart contract comprising a unique token identifier of the gated NFT and associated metadata, the associated metadata comprising an identity of a blockchain hosting the gated NFT, and wherein the processor determines ownership of the gated NFT by review of one of (a) a transaction history associated with the gated NFT recorded in the host blockchain and (b) a digital certificate comprising a name of the gated NFT owner, a status of the gated NFT, the unique token identifier, and the gated NFT owner's digital signature.

8. A method, comprising:

monitoring a plurality of gaming devices in a gaming system to determine a state of the gaming system that is independent of a player's game play;

receiving, from a gaming device of a player of a game of chance, a request to redeem a Non-Fungible Token (NFT), the NFT providing a token benefit from a gaming system available to an owner of the NFT;

determining, by a processor, that the state of the gaming system is a first predetermined state, the NFT being redeemable when the gaming system is in the first predetermined state but not a second predetermined state, wherein the first and second predetermined states each comprise one of a system event involving a plurality of gaming devices, a system event involving a plurality of players, an occupancy level of the plurality of gaming devices, and occurrence of a random event;

in response to the determination that the state of the gaming system is the first predetermined state, determining, by the processor, that the NFT is redeemable upon occurrence of a predetermined gaming event;

determining, by the processor, that the predetermined gaming event, upon which redemption of the NFT is contingent, has occurred, in response to occurrence of the predetermined gaming event, verifying, by the processor, that the player owns a digital wallet identified by the player;

when the player is a verified owner of the digital wallet, determining, by the processor, from the digital wallet that the digital wallet contains the NFT; and when the digital wallet contains the NFT, providing, by the processor, the token benefit to the player.

9. The method of claim 8, wherein the NFT is a gated NFT providing an exclusive token gated benefit from the gaming system available only to an owner of the gated NFT, wherein the predetermined gaming event comprises one of receipt of a payment, transfer of ownership of the gated NFT to a different player, occurrence of a gameplay event, play of the game of chance a predetermined number of times within a predetermined time interval, play of the game of chance using at least a minimum denomination, expiration of a specified time interval, the player being located in a selected physical location, a loyalty level of the player, a promotional credit balance of the player, and the gaming system being in a predetermined state, and further comprising initiating, by the processor, a request to a digital ledger associated with the NFT to record in a block provision of the exclusive token gated benefit to the player.

10. The method of claim 9 wherein the exclusive token gated benefit comprises one of an additional gameplay feature, a gameplay setting, a gameplay award, membership in a player group, a player loyalty reward, participation in a non-game event, a promotional credit, and a casino voucher and wherein the verifying comprises:

decrypting a hash of a selected message, generated from a player's private key, using a public key associated with an electronic address associated with the digital wallet.

11. The method of claim 10, wherein the additional gameplay feature comprises at least one of a bonus game, a bonus spin, a different paytable, a payout, an adjusted reel spinning speed, a bonus award, a new symbol, a new game behavior, and a new game rule and wherein the gated NFT is associated with a smart contract comprising a unique token identifier of the gated NFT and associated metadata, the associated metadata comprising a blockchain hosting the gated NFT, and further comprising:

determining, by the processor, ownership of the gated NFT by reviewing one of (a) a transaction history associated with the gated NFT recorded in the host blockchain and (b) a digital certificate comprising a name of the gated NFT owner, a status of the gated NFT, the unique token identifier, and the gated NFT owner's digital signature.

12. The method of claim 8, wherein one of a smart contract and NFT metadata comprises a use counter, wherein the processor decrements the use counter for each redemption of the NFT, and further comprising, when the use counter has a predetermined value, the processor placing the NFT in a first token state blocking further redemptions of the NFT, wherein the use counter corresponds to a displayed icon, and wherein the displayed icon comprises a display parameter having a value that depends on an NFT state determined by the use counter, and wherein in a first NFT state the display parameter has a first value and in a second NFT state the display parameter has a different second value.

13. The method of claim 12, wherein the NET is a gated NFT providing an exclusive token gated benefit from the gaming system available only to an owner of the gated NFT, and further comprising incrementing, by the processor, the use counter upon occurrence of a predetermined event, the predetermined event comprising one of the predetermined event comprising one of receipt of a payment from a player, transfer of ownership of the gated NFT to a different player, occurrence of a gameplay event, play of the game of chance by the player a predetermined number of times within a predetermined time interval, play of the game of chance by the player using at least a minimum denomination, expiration of a specified time interval, the player being located in a selected physical location, a minimum or determined loyalty level of the player, a minimum or determined promotional credit balance of the player, and the gaming system being in a predetermined state and wherein when the use counter is incremented, the processor places the NFT in a second token state enabling a further redemption of the NFT.

14. A gaming system, comprising:

a processor; and computer memory coupled with the processor, the computer memory comprising data stored thereon that, when executed by the processor, causes the processor to:

determine that a predetermined event has occurred in the gaming system; and in response, changing a value of a use counter associated with a Non-Fungible Token (NFT) associated with a player, wherein the use counter determines a number of possible token redemptions for the NFT, wherein the use counter corresponds to a displayed icon, wherein the displayed icon comprises a display parameter having a value that depends on an NFT state determined by the use counter, and wherein, in a first NFT state, the display parameter has a first value and, in a second NFT state, the display parameter has a different second value, wherein redemption of the NFT by a player is contingent upon occurrence of a predetermined event and a predetermined state of the gaming system independent of the player's game play and the predetermined state of the gaming system comprising one of a system event involving a plurality of gaming devices, a system event involving a plurality of players, an occupancy level of the plurality of gaming devices, and occurrence of a random event.

15. The gaming system of claim 14, wherein the NFT is a gated NFT that provides an exclusive token gated benefit from the gaming system available only to an owner of the gated NFT and wherein the exclusive token gated benefit comprises one of an additional gameplay feature, a gameplay setting, a gameplay award, membership in a player group, a player loyalty reward, participation in a non-game event, a promotional credit award, and a casino voucher and wherein the processor initiates a request to a digital ledger associated with the NFT to record in a block the changing of the value of the use counter.

16. The gaming system of claim 14, wherein one of a smart contract and NFT metadata comprises the use counter, wherein the processor changes the value of the use counter for each redemption of the NFT, and wherein the processor authenticates ownership of a digital wallet using a hash of a selected message, generated using a player's private key associated with the digital wallet, using a public key associated with an electronic address associated with the digital wallet, the public key being determined using the electronic address.

17. The gaming system of claim 16, wherein the processor changes the value of the use counter to a prior value upon occurrence of a predetermined event, the predetermined event comprising one of the predetermined event comprising one of receipt of a payment from a player, transfer of ownership of the NFT to a different player, occurrence of a gameplay event, play of a game of chance by the player a predetermined number of times within a predetermined time interval, play of the game of chance by the player using at least a minimum denomination, expiration of a specified time interval, the player being located in a selected physical location, a minimum or determined loyalty level of the player, a minimum or determined promotional credit balance of the player, and the gaming system being in a predetermined state and wherein a presentation parameter in metadata associated with an NFT icon changes based on a current value of the use counter.

18. The gaming system of claim 14, wherein the predetermined event comprises one of receipt of a payment from the player, transfer of ownership of the NFT to a different player, occurrence of a gameplay event, play of the game of chance by the player a predetermined number of times within a predetermined time interval, play of the game of chance by the player using at least a minimum denomination, expiration of a specified time interval, the player being located in a selected physical location, a minimum or determined loyalty level of the player, and a minimum or determined promotional credit balance of the player.

19. The gaming system of claim 14, wherein metadata associated with the NFT comprises the use counter, wherein the value of the use counter is embedded or encoded in graphical presentation information associated with the NFT such that an appearance of an NFT icon indicates a current value of the use counter, wherein the NFT is associated with a smart contract comprising a unique token identifier of the NFT and associated metadata, the metadata comprising an identity of a blockchain hosting the NFT, and wherein the processor determines ownership of the NFT by review of one of (a) a transaction history associated with the NFT recorded in the host blockchain and (b) a digital certificate comprising a name of the NFT owner, a status of the NFT, the unique token identifier, and the NFT owner's digital signature.

* * * * *